(12) United States Patent
Wu et al.

(10) Patent No.: US 8,208,765 B2
(45) Date of Patent: Jun. 26, 2012

(54) SEARCH AND RETRIEVAL OF DOCUMENTS INDEXED BY OPTICAL CHARACTER RECOGNITION

(75) Inventors: Bo Wu, Shanghai (CN); Jianjun Dou, Shanghai (CN); Ning Le, Shanghai (CN); Yadong Wu, Shanghai (CN); Jing Jia, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 1204 days.

(21) Appl. No.: 11/972,446

(22) Filed: Jan. 10, 2008

(65) Prior Publication Data
US 2009/0028446 A1 Jan. 29, 2009

(30) Foreign Application Priority Data

Jul. 23, 2007 (CN) .......................... 2007 1 0129606

(51) Int. Cl.
*G06K 9/00* (2006.01)
(52) U.S. Cl. ......... 382/305; 382/185; 382/230; 707/706
(58) Field of Classification Search .................. None
See application file for complete search history.

(56) References Cited

U.S. PATENT DOCUMENTS

| | | | | |
|---|---|---|---|---|
| 4,985,863 A | * | 1/1991 | Fujisawa et al. ....................... 1/1 |
| 5,245,674 A | | 9/1993 | Cass et al. | |
| 5,821,929 A | | 10/1998 | Shimizu et al. | |
| 5,835,633 A | * | 11/1998 | Fujisaki et al. ............... 382/187 |
| 5,943,443 A | | 8/1999 | Itonori et al. | |
| 5,999,647 A | * | 12/1999 | Nakao et al. ................... 382/187 |
| 6,125,204 A | * | 9/2000 | Nakatsuka et al. ........... 382/173 |
| 6,463,428 B1 | | 10/2002 | Lee et al. | |
| 2007/0019864 A1 | | 1/2007 | Koyama et al. | |

FOREIGN PATENT DOCUMENTS

| | | |
|---|---|---|
| CN | 1402854 A | 3/2003 |
| CN | 1535430 A | 10/2004 |
| CN | 1851713 A | 10/2006 |

(Continued)

OTHER PUBLICATIONS

Lee et al. (Oct. 1993) "A Markov language model in Chinese text recognition." Proc. 2nd Int'l Conf. on Document Analysis and Recognition, pp. 72-75.*

(Continued)

*Primary Examiner* — Bhavesh Mehta
*Assistant Examiner* — Barry Drennan
(74) *Attorney, Agent, or Firm* — Birch, Stewart, Kolasch & Birch, LLP

(57) ABSTRACT

An image of a character string composed of M pieces of characters is clipped from a document image, and the image is divided into separate characters. Image features of each character image are extracted. Based on the image features, N (N>1, integer) pieces of character images in descending order of degree of similarity are selected as candidate characters, from a character image feature dictionary which stores the image features of character image in units of character, and a first index matrix of M×N cells is prepared. A candidate character string composed of a plurality of candidate characters constituting a first column of the first index matrix, is subjected to a lexical analysis according to a language model, and whereby a second index matrix having a character string which makes sense is prepared. In the language model, statistics are taken and then, the lexical analysis is performed.

15 Claims, 23 Drawing Sheets

FOREIGN PATENT DOCUMENTS

| | | |
|---|---|---|
| JP | 5-216995 A | 8/1993 |
| JP | 6-103415 A | 4/1994 |
| JP | 7-152774 A | 6/1995 |
| JP | 8-153110 A | 6/1996 |
| JP | 9-319747 A | 12/1997 |
| JP | 10-74250 A | 3/1998 |
| JP | 11-316797 A | 11/1999 |
| JP | 2000-90201 A | 3/2000 |
| JP | 2000-181994 A | 6/2000 |
| JP | 2002-24765 A | 1/2002 |
| JP | 2002-245062 A | 8/2002 |
| JP | 2003-108926 A | 4/2003 |
| JP | 2007-26386 A | 2/2007 |
| JP | 2007-148925 A | 6/2007 |
| JP | 2007-172077 A | 7/2007 |
| WO | WO-01/40987 A1 | 6/2001 |

OTHER PUBLICATIONS

Janssen et al. (Nov. 2003) "UpLib: A universal personal digital library system." Proc. 2003 ACM Symp. on Document Engineering.*

* cited by examiner

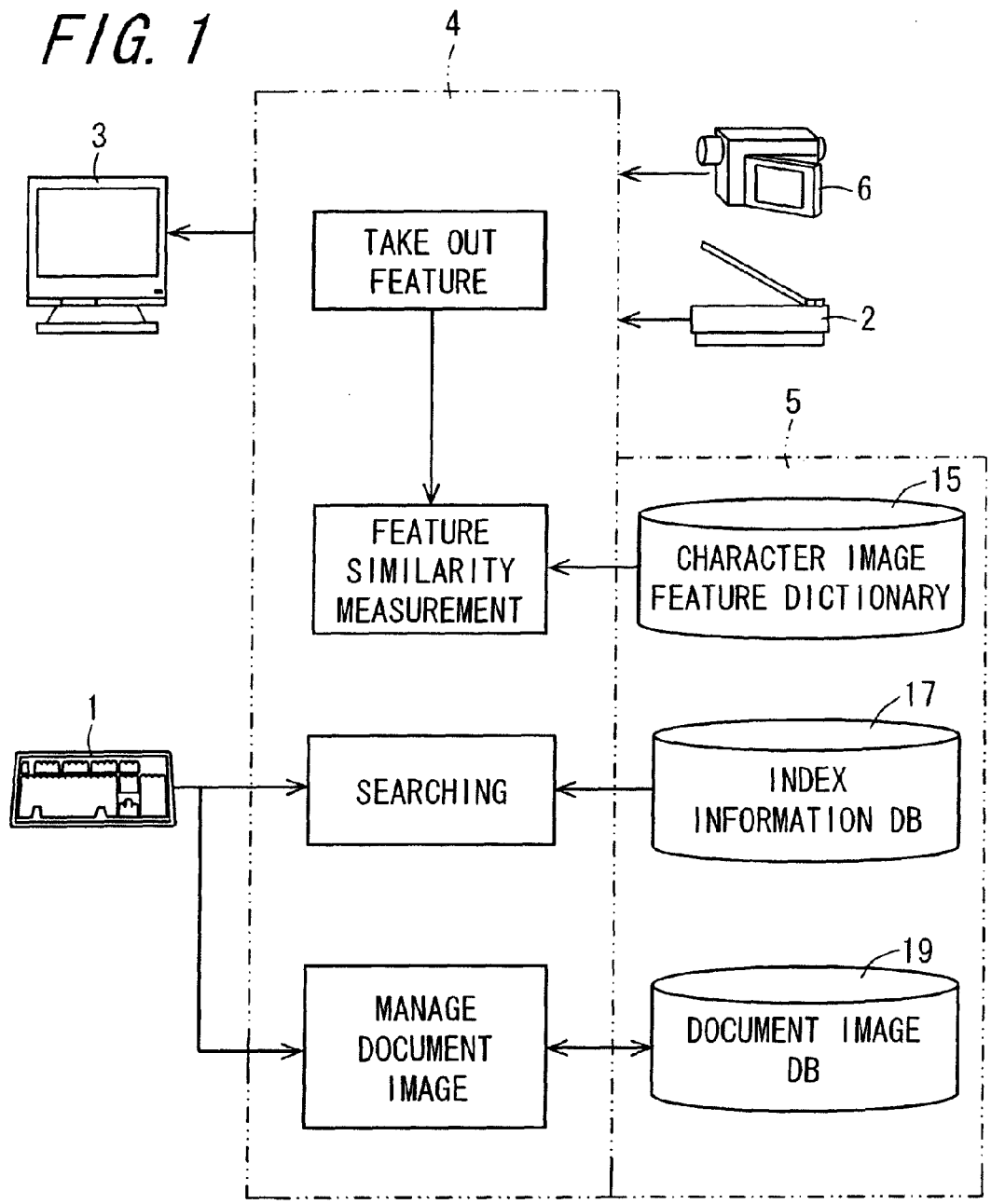

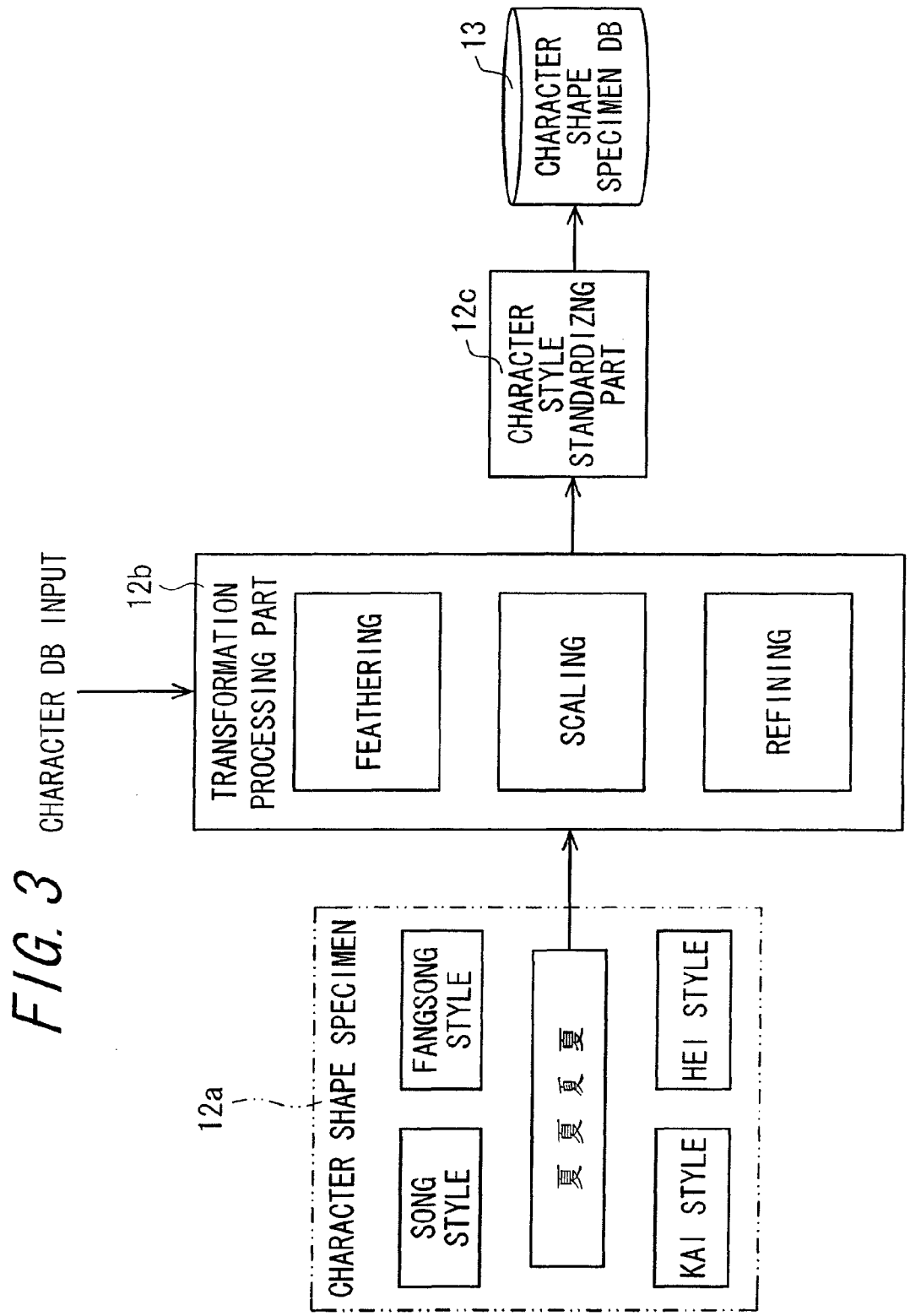

FIG. 11

| Initials | Num of Co-occurrence word | Co-occurrence word | Frequency | Character num of words |
|---|---|---|---|---|
| 啊 | 5 | 阿 | 1 | 2 |
| | | 草 | 2 | 2 |
| | | 地 | 1 | 2 |
| | | 辺 | 3 | 2 |
| | | 填 | 1 | 2 |
| 阿 | 123 | 巴 | 9 | 2 |
| | | 北 | 3 | 2 |

FIG. 15

IF:
- SEARCH KEYWORD INCLUDES R PIECES OF CHARACTERS: $C_1, C_2, \ldots, C_r$;
- INDEX MATRIX HAS M×N CELLS, CORRELATION VALUE MATRIX "Weight" HAS M×N CELLS, AND Weight[i][j] REPRESENTS CORRELATION VALUE WHEN CHARACTER AT Index[i][j] IS IN SIMIRARITY;
- DEGREE-OF-CORRELATION WEIGHTING FACTOR FOR ROWS IS REPRESENTED BY A SYMBOL Q; AND
- CORRELATION VALUES ARE REPRESENTED BY $W_1, W_2, \ldots, W_r$ WHEN CHARACTER IS IN SIMIRARITY.

+

IF:
RESPECTIVE CHARACTERS $C_1, C_2, \ldots, C_r$, ARE MATCHED AT
$[C_1i, C_1j], [C_2i, C_2j], \ldots, [C_ri, C_rj]$ IN INDEX MATRIX;
AND
$C(k+1)i = C_k i+1, C(m+1)i = C_m i+1 \ (m>k)$  $\ldots$ (1)

=

THEN:
- DEGREE OF CORRELATION BETWEEN SEARCH KEY WORD AND INDEX MATRIX IS EXPRESSED BY:
  SimDegree = $W_1 + W_2 + \ldots + W(k-1) + Q*(W_k + W(k+1)) + \ldots + W(m-1) + Q*(W_m + W(m+1)) + \ldots + W_r \ldots$ (2)
  WHERE $W_1$=Weight[C1i][C1j], $W_2$=Weight[C2i][C2j], $\ldots$, $W_r$=Weight[Cri][Crj]

SEARCH AND RETRIEVAL OF DOCUMENTS INDEXED BY OPTICAL CHARACTER RECOGNITION

CROSS-REFERENCE TO RELATED APPLICATION

This application claims priority to Chinese Patent Application No. 200710129606.5, which was filed on Jul. 23, 2007, the contents of which are incorporated herein by reference in its entirety.

BACKGROUND OF THE INVENTION

1. Field of the Invention

The present invention relates to a document image processing apparatus and method for inputting and storing a document as an image, more specifically to a document image processing apparatus having a function of searching stored document images, to a document image processing method using the function, to a document image processing program and to a recording medium on which the document image processing program is recorded.

2. Description of the Related Art

A document filing apparatus has been in practical use, which utilizes an image inputting device such as an image scanner to convert a document into an image and electronically store the image, and enables searching of the document later on. A technique relating to the document filing apparatus just mentioned has been disclosed in Chinese Unexamined Patent Publications CN1402854A, CN1535430A, and CN1851713A.

To search the document images read out as image data, it is necessary to take work to manually provide index information for searching, to the respective document images. Consequently, this requires enormous labor.

In addition, an apparatus has also been proposed, which locates a character region (a text region) of document image, performs optical character reader (OCR) recognition, and enables a full-text search according to the text content. The related art using the OCR recognition includes, for example, the technique disclosed in Japanese Unexamined Patent Publication JP-A 7-152774 (1995).

However, it problematically requires considerable calculation and thus a long time to achieve the OCR recognition. Moreover, a low recognition rate may lead to false recognition which causes a failure in searching for the target character. Accordingly, the OCR recognition has a problem in search precision.

Meanwhile, Japanese Unexamined Patent Publication JP-A 10-74250 (1998) discloses a technique which enables the automatic full-text search without using the OCR recognition.

In the constitution of the aforementioned Publication, a category dictionary is prepared in advance, in which characters are classified based on image features into similar character categories for each of the similar characters. And then, at the time of registering a document image, no character recognition is performed on any characters in a text region (a character region) while image features are extracted to be used for classifying the characters into character categories, and the category series recognized for respective characters are stored together with the inputted images. At the time of searching, the respective characters in a search keyword are converted into corresponding categories, and document images partially containing the converted category series are taken out as a search result.

And then, as an effect of the constitution, it is described that the constitution can provide a document filing which enables high-speed processing with low computational power for registering documents and which can realize a low rate of incomplete search in searching for the target character.

For example, when index information for searching is prepared on the basis of the technique of the JP-A 10-74250, characters similar in image feature, of all the characters constituting a headline are recorded in the index information as candidate characters in order of degree of similarity.

The degree of similarity provided in the index information is mainly used at the time of comparing a search keyword and the index information.

The degree of similarity is only an independently-set parameter for each character. Features of phrase in the headline word are not reflected in the index information. As a result, the search precision is still insufficient.

SUMMARY OF THE INVENTION

An object of the present invention is to provide a document image processing apparatus, a document image processing method, a document image processing program, and a recording medium on which the document image processing program is recorded, in each of which improved index information is used to realize higher search precision.

The invention provides a document image processing apparatus comprising:

a character image feature dictionary for storing image features of character images in units of character;

a character string clipping portion for clipping character images in units of character string composed of a plurality of characters from an inputted document image;

an image feature extracting portion for dividing the character image of the character string clipped by the character string clipping portion, character by character, and extracting an image feature of the divided respective character images;

a feature similarity measurement portion for selecting N (N>1, integer) pieces of character images in descending order of degree of similarity of image feature as candidate characters, from the character image feature dictionary which stores image features of character images in units of character based on the image features of each of the character images extracted by the image feature extracting portion, preparing a first index matrix of M×N cells where M (M>1, integer) represents a number of characters in the clipped character string, and preparing a second index matrix of character strings including a meaningful character string which is formed by adjusting candidate character strings by application of a lexical analysis using a predetermined language model to the candidate character strings composed of a plurality of candidate characters constituting a first column of the first index matrix;

an index information storing portion for storing the second index matrix prepared by the feature similarity measurement portion, so as to correspond to the inputted document image; and a searching section for searching, in a searching operation, the index information storing portion in units of search character constituting a search keyword of an inputted search formula, to take out the document image which includes the second index matrix containing the search character.

According to the invention, the image feature extracting portion divides the images of character strings in the document images which character strings are located and clipped by the character string clipping portion, character by character, and extracts image features of each of the character images. And then, on the basis of the image features, the feature similarity measurement portion selects N (N>1, integer) pieces of character images in descending order of degree of similarity of image feature as candidate characters, from the character image feature dictionary which stores image features of character images in units of character, and prepares a first index matrix of M×N cells where M (M>1, integer) represents the number of the characters in the clipped character string.

Further, the candidate character string which is composed of the plurality of candidate characters constituting a first column of the first index matrix, is subjected to a lexical analysis according to the predetermined language model, to be thereby adjusted into a character string which makes sense. An index having the character string which makes sense is referred to as a second index matrix.

The prepared second index matrix is stored by the index information storing portion so as to correspond to the inputted document image. In the searching operation, the index matrix is used as index information for searching the document image.

By doing so, without troubling a user and without using the OCR recognition, it is possible to automatically locate a character string in a character region of a document image and produce index information of the document image based on image features of the located character string.

In addition, the image feature of each of character images is extracted, and a plurality of candidate characters similar in image feature are selected, with the result that the appropriate setting of the number of the candidate characters to be selected will shorten the length of time necessary for the character recognition which used to require a long time in the OCR recognition, and eliminate incomplete recognition, thus allowing for the precise search.

Further, since a character string that makes sense is inputted as a search keyword, the candidate character strings of the second index matrix which make sense can enhance the search precision.

Further, since the character image feature dictionary is prepared so as to contain image features of character images in units of single character and the feature similarity measurement portion divides the image of clipped character string into character images of single characters, an index matrix prepared is of high precision.

At the time of searching, the searching section searches the index information storing portion in units of search character constituting the search keyword of the inputted search formula. Moreover, the searching section takes out a document image which includes the index matrix containing the search characters.

As has been mentioned heretofore, the index matrices are analyzed in units of search character constituting the search keyword, to thereby detect the index matrix containing the search keyword. Consequently, this can ensure an overall search owing to the character-by-character search.

Further, in the invention, it is preferable that the feature similarity measurement portion performs the lexical analysis on the candidate character strings by adopting a bi-gram or multi-gram model as a language model.

Further, according to the invention, the feature similarity measurement portion can adopt a bi-gram or multi-gram model as a language model.

Further, in the invention, it is preferable that the feature similarity measurement portion adjusts, based on the lexical analysis, the candidate characters of the first column in the first index matrix into a meaningful candidate character string by replacing the candidate character of the first column by another candidate character in the same row in the first index matrix.

Further, according to the invention, the feature similarity measurement portion adjusts, based on the lexical analysis, the candidate characters of the first column in the first index matrix into a meaningful candidate character string by replacing the candidate character of the first column by another candidate character in the same row in the first index matrix.

By doing so, the candidate character string can be adjusted at the same degree of similarity as that of the first index matrix.

Further, in the invention, it is preferable that the character string clipping portion clips a heading region from the inputted document image.

According to the invention, the character string clipping portion clips the heading region from the document image, and therefore the index matrix will be prepared for a headline of the document image.

As a result, compared to the case of preparing the index matrix for the whole text region of a document image, the number of the index matrices prepared for one document image can be reduced, which enables the document image to be searched by only searching for the headline and enables an efficient keyword search.

Further, in the invention, it is preferable that the character string clipping portion clips an important region from the document image according to a statistical analysis of communicating area.

According to the invention, this allows the character string clipping portion to easily clip the heading regions from the document image.

Further, in the invention, it is preferable that the image feature extracting portion extracts an image feature of character image by combining a grid-direction-wise feature and a character image peripheral feature.

Further, according to the invention, this enables efficient extraction of image features although it depends on character-shape differences.

Further, in the invention, it is preferable that the feature similarity measurement portion selects candidate characters by measuring similarity of all character images stored in the character image feature dictionary to the extracted image features of the character images.

Further, according to the invention, the index matrix can be prepared by selecting candidate characters in the most accurate order.

Further, in the invention, it is preferable that the number N of candidate characters to be selected by the feature similarity measurement portion is variable.

Further, according to the invention, the number N of candidate characters is variable, with the result that the index matrix can be prepared according to a user's request. For example, a smaller value of the number N of candidate characters causes a reduction in the dimension of the index matrix, which allows for a shorter search time, resulting in higher search precision and search accuracy. Oppositely, a larger value of the number N of candidate characters causes an increase in the dimension of the index matrix, which eliminates incomplete search, resulting in higher search efficiency.

Further, in the invention, it is preferable that the searching section takes out the document images sequentially from the document image having an index matrix where degree of similarity of each of search characters constituting the search keyword is high.

According to the constitution of the aforementioned Publication JP-A 10-74250, the search keyword is converted into a representative code string during searching, therefore failing to analyze positions in the similar character categories. For this reason, regardless of the degree of similarity, all the characters belonging to the same similar character category have the same relative condition. Consequently, this causes a failure to extract the document images accurately in descending order of relativity.

However, according to the invention, the searching section takes out document images sequentially from the document image having an index matrix where degree of similarity of each of search characters constituting the search keyword is high, with the result that the search result of document images can be presented in descending order of relativity.

Further, in the invention, it is preferable that a position-based correlation value is set for each of the elements in the index matrix, and the searching section comprises:

an index matrix search processing portion for searching the second index matrix in units of search character constituting the search keyword to detect the second index matrix containing the search characters, and storing in a storing portion, information of matching position of search characters in the second index matrix together with information of the document images having the second index matrix;

a degree-of-correlation calculating portion for calculating a degree of correlation between the search word and the second index matrix by accumulating correlation values of the respective search characters according to the information of matching position stored in the storing section; and an order determining portion for determining a take-out order of document image based on the calculated result of the degree-of-correlation calculating portion.

According to the invention, the position-based correlation value is set for each element in the index matrix. The correlation value is calculated between the search characters and the candidate characters in the index matrix. Moreover, the correlation value is set in accordance with an order of candidate characters selected by the feature similarity measurement portion. Normally, an element positioned in a lower-number column has a larger correlation value.

In units of search character constituting the search keyword, the index matrix search processing portion of the searching section searches the index matrices, and detects the index matrix containing the search characters. Moreover, the index matrix search processing portion stores both the information of matching position of search characters in the detected index matrices and the information of the document images having the index matrix, in the storing portion where these pieces of information are stored.

And then, the degree-of-correlation calculating portion of the searching section accumulates the correlation values of the respective search characters according to the information of matching position stored in the storing portion. In this way, the degree-of-correlation calculating portion calculates the degree of correlation between the search keyword and the index matrix. The order determining section takes out the document images in descending order of the degree of correlation thereof.

Consequently, this enables the document images to be taken out sequentially from the document image having an index matrix where the matching position is high of each of the search characters constituting the search keyword. And, this also easily enables the search results of document images to be presented in descending order of relativity.

Further, in the invention, it is preferable that, when the information of matching position indicates that the search character is found in adjacent rows in the index matrix, the degree-of-correlation calculating portion accumulates correlation values of the respective adjacent rows after weighted by a degree-of-correlation weighting factor for rows.

According to the invention, when the degree-of-correlation calculating portion confirms that the search character is found in the adjacent rows in the index matrix, the degree-of-correlation weighting factor is weighted to the correlation values of the respective adjacent rows. That is, while searching is performed on each character, two successively-positioned search characters may be included in the search keyword. In this case, the search result of document images having such an index matrix, exhibits a higher degree of correlation. Consequently, this enables effective search to be performed with simple calculation.

Further, in the invention, it is preferable that the correlation value set for each of the elements in the second index matrix is variable.

According to the invention, the correlation value is set to be variable, thereby enabling the search to be performed according to a user's request. For example, even when the number N of candidate characters is the same, the search result varies by applying such a change that the column-number-based correlation values of the N pieces of candidate characters are set at high values for the first to A-th candidate characters while set at low values for the candidate characters following the A-th candidate character. By doing so, a flexible response can be made according to the user's request.

Further, in the invention, it is preferable that the degree-of-correlation weighting factor is variable.

Further, according to the invention, the degree-of-correlation weighting factor is set to be variable, thereby enabling the search to be performed according to the user's request. For example, the higher degree-of-correlation weighting factor contributes more to the correlation value to be calculated, resulting in a large value for a character correlation value of two rows successively in similarity, that is, resulting in a search result close to a result obtained by searching for a whole vocabulary. On the other hand, as the degree-of-correlation weighting factor is set at a low value, the search result becomes closer to a result obtained by searching in units of character. By doing so, the flexible response can be made in such a manner as to perform the search according to the user's request.

Further, in the invention, it is preferable that the document image processing apparatus further comprises a character image feature dictionary preparing section for preparing the character image feature dictionary by use of the image feature extracting portion.

Further, according to the invention, the character image feature preparing portion works in combination with the image feature extracting portion to prepare the character image feature dictionary. Consequently, the user can easily prepare the character image feature dictionary by extracting features of character shape of characters having different character styles, character sizes, and character fonts. In addition, for not only the characters different in the character styles, etc, but also characters of different languages, the character image feature dictionary can be easily prepared for respective character styles, character sizes, and character fonts.

The invention provides a document image processing method comprising:

a character string clipping step for clipping character images in unit of character string composed of a plurality of characters from an inputted document image;

an image feature extracting step for extracting an image feature of each character image which is obtained by dividing character images of character string clipped in the character string clipping step, for each of the characters;

a feature similarity measurement step for selecting N (N>1, integer) pieces of character images in descending order of degree of similarity of image feature as candidate characters, from the character image feature dictionary which stores image features of character images in units of character based on the image features of each of the character images extracted in the image feature extracting step, preparing a first index matrix of M×N cells where M (M>1, integer) represents a number of characters in the clipped character string, and preparing a second index matrix of character strings including a meaningful character string which is formed by adjusting candidate character strings by application of a lexical analysis using a predetermined language model to the candidate character strings composed of a plurality of candidate characters constituting a first column of the first index matrix;

an index information storing step for storing the second index matrix prepared in the feature similarity measurement step, so as to correspond to the inputted document image; and a searching step for searching, in a searching operation, the index information stored in the index information storing step, in units of search character constituting a search keyword of an inputted search formula, to take out the document image which includes the second index matrix containing the search character.

According to the invention, in the image feature extracting step, the image of character string located in the document images and clipped therefrom in the character string clipping step is divided in units of character. Moreover, the image feature of each character image is extracted in the image feature extracting step. And then, on the basis of the image feature, in the feature similarity measurement step, N (N>1, integer) pieces of character images are selected in descending order of degree of similarity of image feature as the candidate characters, from the character image feature dictionary. The character image feature dictionary stores the image feature of character image in units of character. Further, in the feature similarity measurement step, the first index matrix of M×N cells where M represents the number of the characters in the clipped character string and N represents the number of the above character images.

Further, the candidate character string which is composed of the plurality of candidate characters constituting the first column of the first index matrix, is subjected to the lexical analysis according to the predetermined language model, to be thereby adjusted into the character string which makes sense. An index having the character string which makes sense is referred to as the second index matrix.

The prepared second index matrix is stored by the index information storing portion so as to correspond o the inputted document image. In the searching operation, the index matrix is used as index information for searching the document image.

By doing so, without troubling the user and without using the OCR recognition, it is possible to automatically locate character strings in a character region of document image and produce index information of document image based on image features of the located character string.

In addition, the image feature of each character image is extracted, and a plurality of candidate characters similar in image feature are selected, with the result that appropriate setting of the number of the candidate characters to be selected will shorten the length of time necessary for the character recognition which used to require a long time in the OCR recognition, and eliminate incomplete recognition, thus allowing for the precise search.

Further, a character string inputted as the search keyword makes sense and therefore, the candidate character string of the second index matrix which makes sense can enhance the search precision.

Further, as for all the characters, the character image feature dictionary is prepared so as to contain the image feature of character image of separate characters. In the feature similarity measurement step, the image of clipped character string is divided into the character image of separate characters. In this state, the similarity measurement of image feature is performed in the feature similarity measurement step. Consequently, the prepared index matrix has high precision.

In the searching step, the index information storing portion is searched in units of search character constituting the search keyword of the inputted search formula. Moreover, in the searching step, the document images which include the index matrix containing the search characters, are taken out.

As has been mentioned heretofore, the index matrices are analyzed in units of search character constituting the search keyword, to thereby detect the index matrix containing the search keyword. Consequently, this can ensure an overall search owing to the character-by-character search.

Further, the invention provides a document image processing program for causing a computer to perform the document image processing method.

Further, the invention provides a computer-readable recording medium on which is recorded a document image processing program for causing a computer to perform the document image processing method.

According to the invention, it is possible to provide the document image processing program and the computer-readable recording medium on which the document image processing program is recorded.

BRIEF DESCRIPTION OF THE DRAWINGS

Other and further objects, features, and advantages of the invention will be more explicit from the following detailed description taken with reference to the drawings wherein:

FIG. 1 is a block diagram schematically showing a constitution of a document image processing apparatus;

FIG. 3 is a view showing a process on how a character style normalization processing portion prepares a character shape specimen DB;

FIG. 11 is a view showing a constitution example of dictionary data used in a bi-gram model;

FIG. 15 is an illustration showing a method of calculating a degree of correlation between a search keyword and an index matrix;

DETAILED DESCRIPTION

Figure 2A:
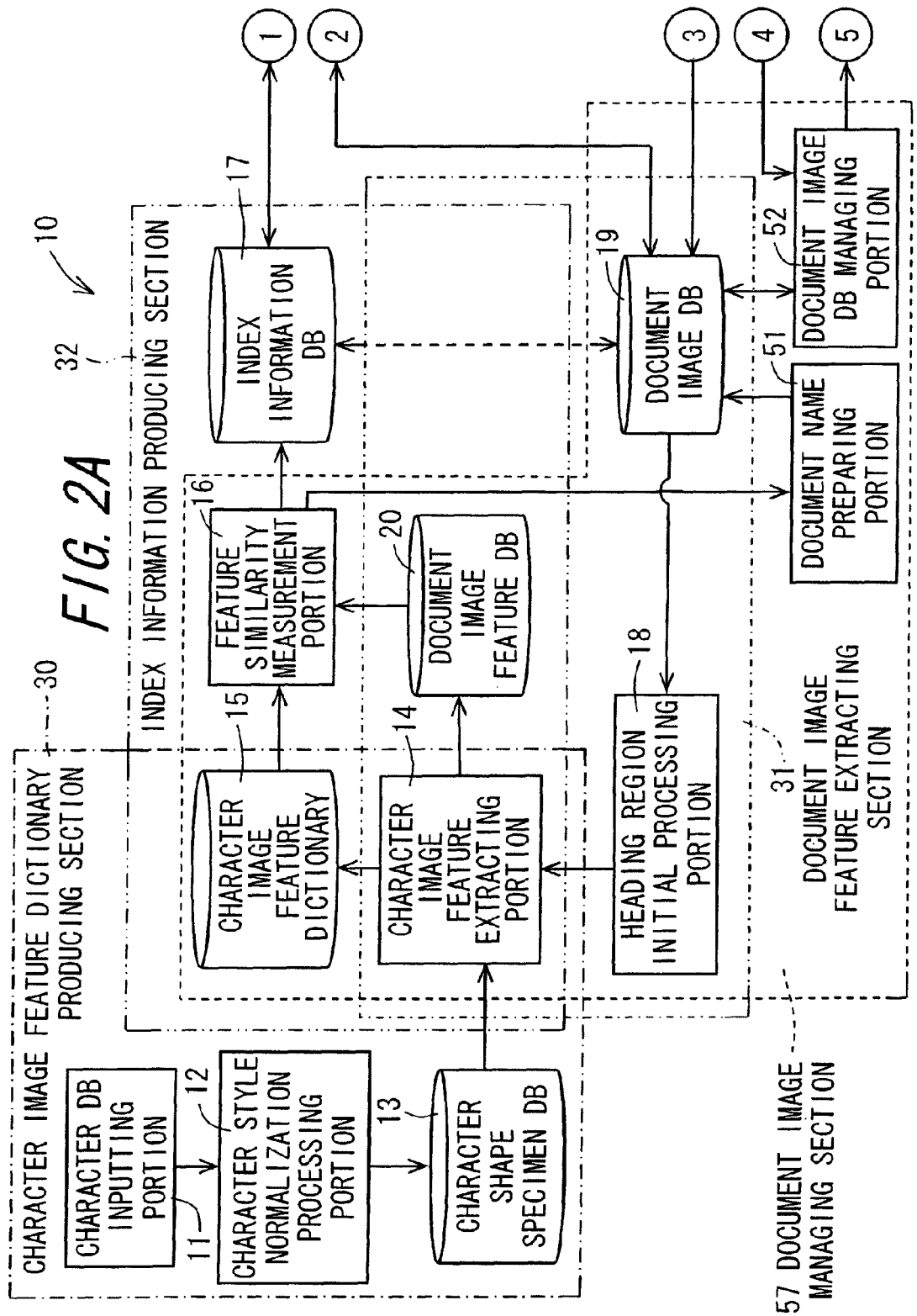
FIGS. 2A and 2B are block diagrams showing in detail the constitution of the document image processing apparatus.

Now referring to the drawings, preferred embodiments of the invention are described below.

FIG. 1 is a block diagram schematically showing a constitution of the document image processing apparatus 10. The document image processing apparatus 10 includes a processor 4 and an external storage device 5. The external storage device 5 stores software etc. which is used by the processor 4 to perform an actual processing.

The processor 4 performs actually a document image feature extracting process, an index information producing process, a search process, a document image managing process, and the like. In the document image feature extracting process, a search key heading region is clipped from a document image. In the index information producing process, index information is produced that makes it possible to search the document image. The index information is used in the search process. In the document image managing process, a meaningful document name is prepared by use of the index information so as to manage the document image. The meaningful document name will be described later on.

The actual processing of the processor 4 is performed by use of the software stored in the external storage device 5. The processor 4 is constructed of, for example, a main body of a common computer. In the present embodiment, the processor 4 is so provided as also to be able to perform a character image feature dictionary preparing process. In the character image feature dictionary preparing process, a character image feature dictionary 15 is prepared which is used in the index information producing process and will be described later on.

The external storage device 5 can be constructed of, for example, a fast accessible hard disk. For the sake of holding a large quantity of document images, it is acceptable that the external storage device 5 is constructed of a high-capacity device such as an optical disc. The external storage device 5 is designed for use in preparing the character image feature dictionary 15, a index information DB (database) 17, a document image DB 19, a character shape specimen DB 13, and the like component, which will be described later on.

A keyboard 1 and a display device 3 are connected simultaneously to the document image processing apparatus 10. The keyboard 1 is used for inputting a search keyword. In addition, the keyboard 1 is also used for inputting an instruction at the time of browsing a document image. Further, the keyboard 1 is also used for modifying set values, such as the number of candidate characters, a correlation value, and a degree-of-correlation weighting factor for rows Q, which will be described later on. The display apparatus 3 outputs and thereby displays the document image, etc. The content displayed by the display device 3 includes degree of correlation information, an image name, and the like information.

An image scanner 2 or a digital camera 6 is further connected to the document image processing apparatus 10. The image scanner 2 and the digital camera 6 are used for acquiring the document image. A way to acquire the document image is, however, not limited to the way where the image scanner 2 or the digital camera 6 is used. The acquirement of the document image may be realized by communication across a network, and the like. In addition, the image scanner 2 or the digital camera 6 may be used to input the search keyword.

Figure 2B:
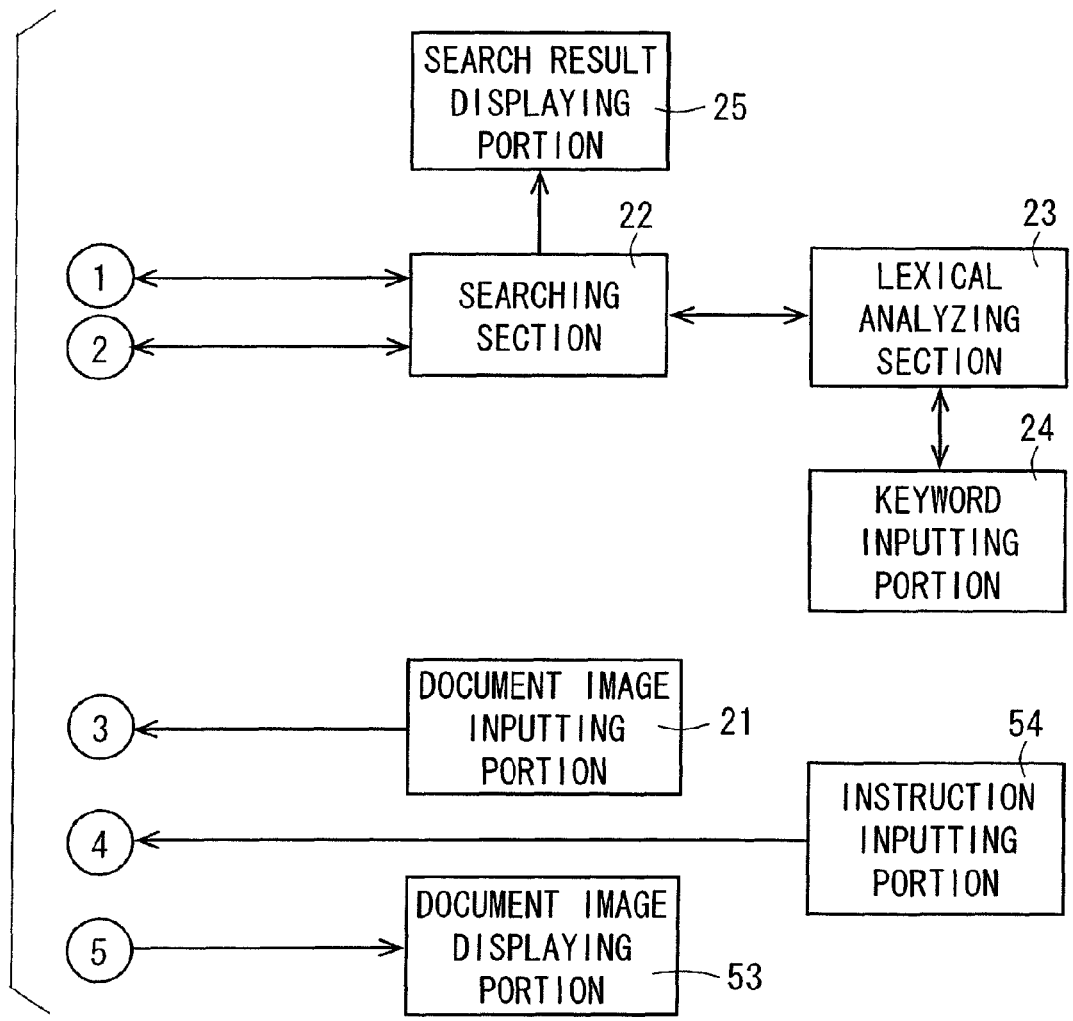

FIGS. 2A and 2B are block diagrams showing in detail the constitution of the document image processing apparatus 10. The document image processing apparatus 10 includes a character database inputting portion (character DB inputting portion) 11, a character style normalization processing portion 12, the character shape specimen DB 13, a character image feature extracting portion (image feature extracting portion) 14, the character image feature dictionary 15, a feature similarity measurement portion 16, the index information DB 17, a heading region initial processing portion 18, the document image DB 19, a document image feature database (document image feature DB) 20, a document image inputting portion 21, a searching section 22, a lexical analyzing section 23, a keyword inputting portion 24, a search result displaying portion 25, a document name preparing portion 51, a document image DB managing portion 52, a document image displaying portion 53, and an instruction inputting portion 54.

Among the components listed above, the character DB inputting portion 11, the character style normalization processing portion 12, the character shape specimen DB 13, the character image feature extracting portion 14, and the character image feature dictionary 15 constitute a character image feature dictionary producing section 30 which performs the aforementioned character image feature dictionary preparing process.

Firstly, descriptions are given to the character DB inputting portion 11, the character style normalization processing portion 12, the character shape specimen DB 13, the character image feature extracting portion 14, and the character image feature dictionary 15 which constitute the character image feature dictionary producing section 30.

The character DB inputting portion 11 is used for inputting a fundamental character database which is necessary for preparing the character image feature dictionary 15. When the present apparatus is adaptable to, for example, Chinese, 6763 characters in the GB2312 of People's Republic of China, and the like element are all inputted to the character DB inputting portion 11. In addition, when the present apparatus is adaptable to Japanese, approximately 3000 characters of JIS level-1, and the like element are inputted to the character DB inputting portion 11. That is to say, the characters mentioned herein include symbols. The character DB inputting portion 11 as has been described heretofore is constructed by the processor 4. The character database is provided via a recording medium or across a network, or the like.

The character style normalization portion 12 is designed to prepare character images different in font and size, of all the characters included in the character database inputted by the character DB inputting portion 11. The character images different in font and size are stored in the character shape specimen DB 13.

FIG. 3 shows a process on how the character style normalization processing portion 12 prepares the character shape specimen DB 13. When the present apparatus is adaptable to Chinese, the character style normalization processing portion 12 is provided with, for example, a character shape specimen 12*a* such as Song style, Fangsong style, Hei style, and Kai style. In addition, when the present apparatus is adaptable to Japanese, the character style normalization processing portion 12 is provided with, for example, a character shape specimen such as Ming-cho style and Gothic style.

The character style normalization processing portion 12 includes a character shape specimen 12*a*, a transformation processing part 12*b*, and a character style standardizing part 12*c*. The transformation processing part 12*b* images the characters in the character database and standardizes resulting character images. Next, in reference to the character shape specimen 12*a*, the transformation processing part 12*b* performs a transformation process on the standardized character images and further prepares character images different in font and size. The transformation process includes a feathering process, a scaling process, and a refining process. The character images already treated with the transformation process as mentioned above are brought by the character style standardizing part 12*c* to the character shape specimen DB 13 where the character images are then stored as reference character images.

In the character shape specimen DB 13, the reference character images of all the characters in the character database are stored in units of the character shape which is defined by font and size even for one identical character. To cite a case, even for one character "中" in the character type, the character shape specimen DB 13 stores as many the reference character images "中" different in shape as the predetermined number of the font. In addition, the character shape specimen DB 13 also stores as many the reference character images "中" different in size as the predetermined number of the size.

The character image feature extracting portion 14 extracts features of character image (abbreviated as the "image features") and stores the extracted features in the character image feature dictionary 15 where the extracted features are then stored. In the present embodiment, the character image feature extracting portion 14 extracts the features of character image by combining character image peripheral features and grid-direction-wise features. The extracted features of character image are adopted as feature vectors. Note that the features of character image are not limited to the feature just described, and other features may be extracted to be feature vectors.

Figure 4:
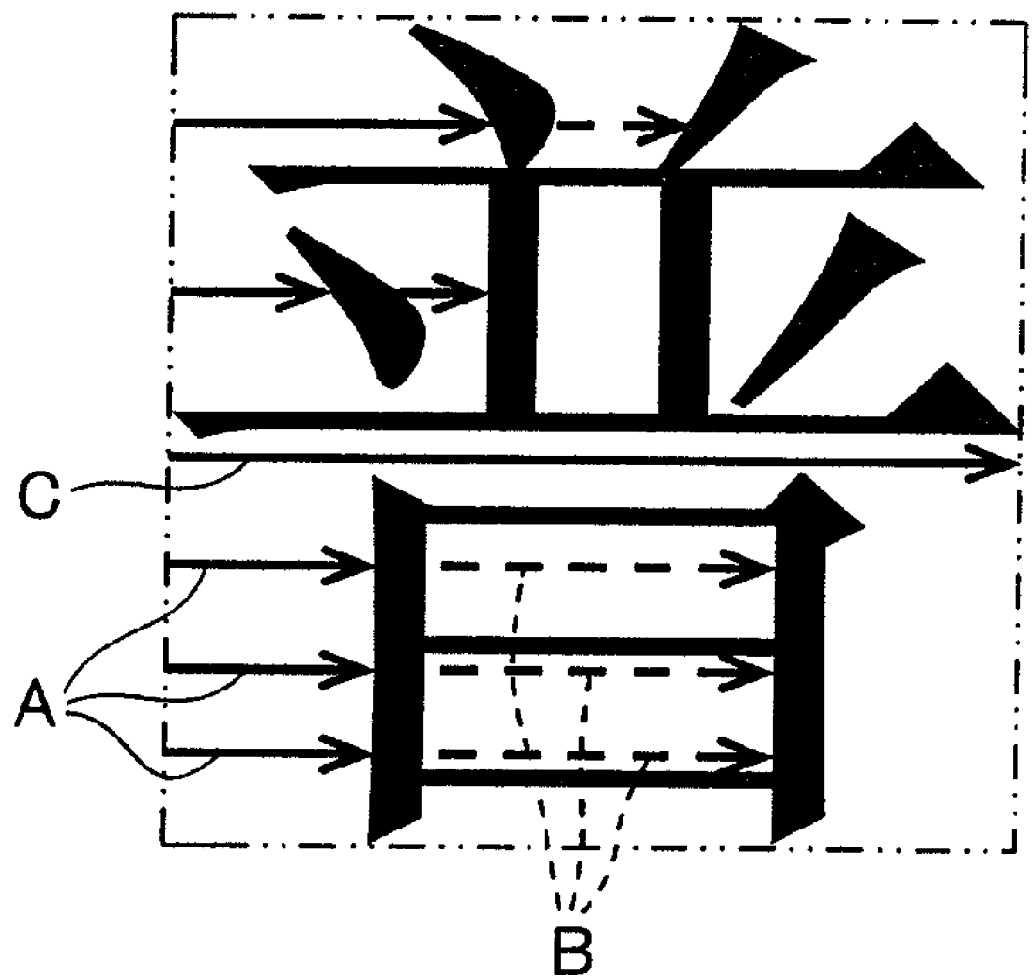
FIG. 4 is an illustration of a character image peripheral feature.

Here, descriptions will be given to the character image peripheral features and the grid-direction-wise features. FIG. 4 is an illustration of the character image peripheral features. The character image peripheral features refer to outline features viewed from without. As shown in FIG. 4, scanning from four sides of a circumscribing rectangle of the character image, a distance from the four sides thereof to a border point between a white pixel to a black pixel is defined as a feature. A position of the first change of the pixel color and a position of the second change of the pixel color are taken out.

For example, the circumscribing rectangle is divided into X rows and Y columns. In this case, the image is subjected to leftward scanning and rightward scanning respectively row by row and is subjected to upward scanning and downward scanning respectively column by column. Note that FIG. 4 shows a diagram where the image is subjected to leftward scanning row by row.

In FIG. 4, a solid arrow A indicates a scanning path to the point of the first change of pixel color from white to black. A dashed arrow B indicates a scanning path extending to the point of the second change of pixel color from white to black. A solid arrow C indicates a scanning path through which no points of pixel color change from white to black are detected. In this case, the distance value is zero.

Figure 5A:
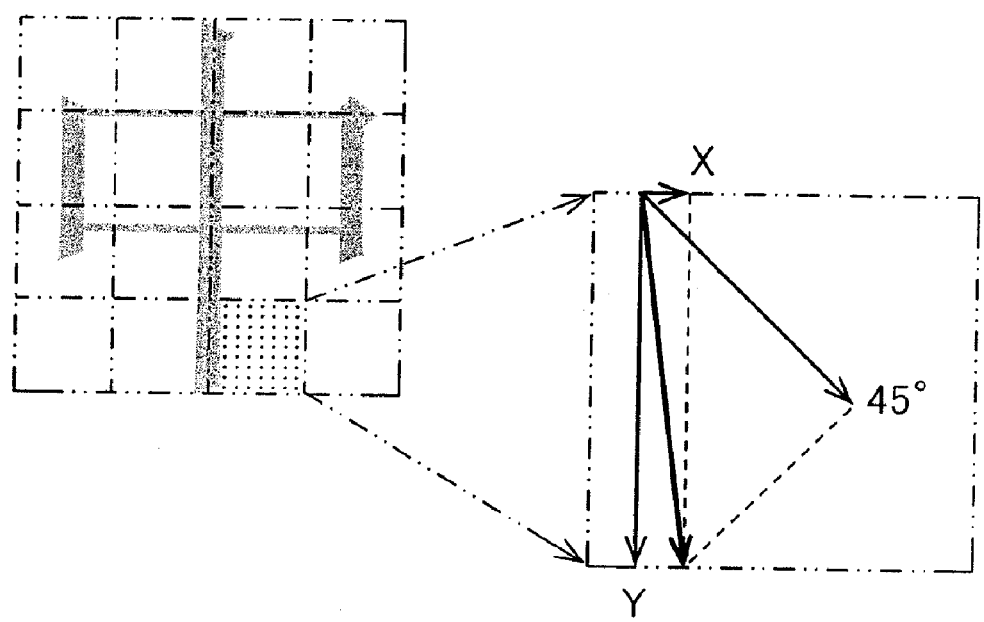
FIGS. 5A and 5B are illustrations of grid-direction-wise features.
Figure 5B:
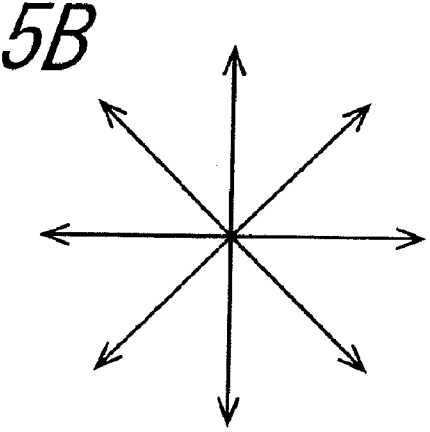

FIG. 5A and FIG. 5B are illustrations of the grid-direction-wise features. A character image is divided in a rough grid pattern. An attempt is made in a plurality of predetermined directions to detect black pixels in the respective grids. A number of black pixels which are connected in each of the directions is counted, and direction contributing degrees which represent a distribution state of the black pixels with respect to each of the direction components thereof is calculated by dividing distance values by a value corresponding to a difference in number of black pixels using Euclidean distance as a discrimination function.

In FIG. 5A, the character image is divided into 16 grids in a 4×4 grid pattern, and black pixels are attempted to be detected in three directions of X-axis direction (0°), a 45-degree direction, and a Y-axis direction (90°) from a center point, i.e., a point of change of pixel color form black to white, which point is located at the shortest distance in the X-axis direction from a grid intersection.

In the present embodiment, the character image is divided in an 8×8 square mesh pattern. As shown in FIG. 5B, black pixels are attempted to be detected in eight directions, namely, a 0-degree direction, a 45-degree direction, a 90-degree direction, a 135-degree direction, a 180-degree direction, a 225-degree direction, a 270-degree direction, and a 315-degree direction.

Note that grid-direction-wise feature extracting methods may be various with different directions in which black pixels are attempted to be detected or with different positions of the center point about which black pixels are attempted to be detected. For example, refer to the descriptions in Japanese Unexamined Patent Publication JP-A 2000-181994.

The character image feature extracting portion 14 carries out the extraction of feature of character image as just described, on all the reference character images stored in the character shape specimen DB 13. And the character image feature extracting portion 14 stores an extraction result of the reference character image stored in the character shape specimen DB 13 in the character image feature dictionary 15 where the extraction result is then stored, thus producing the character image feature dictionary 15.

Figure 6:
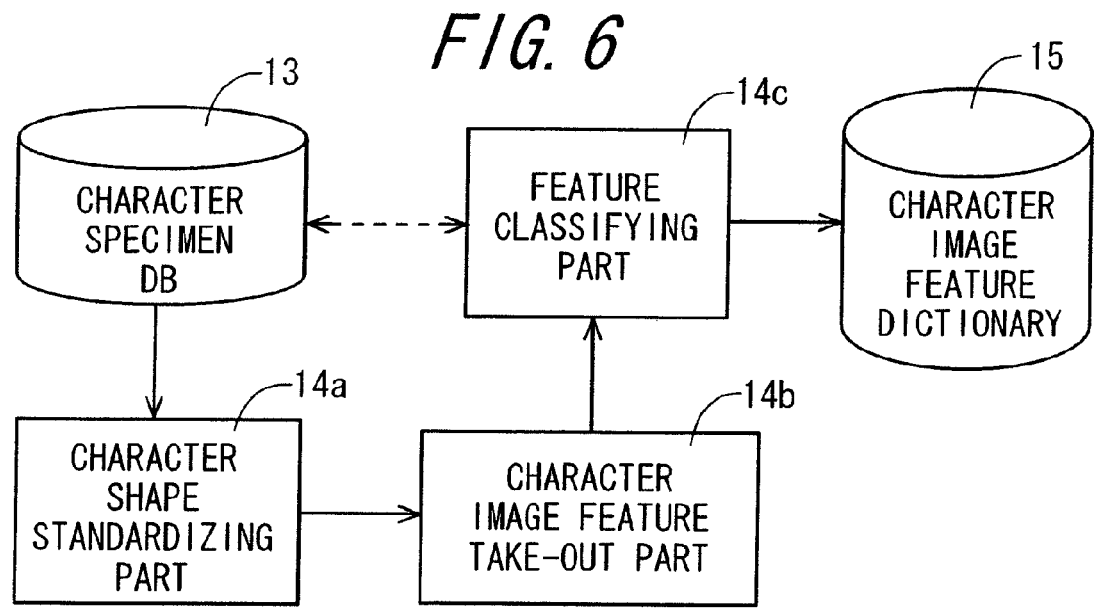
FIG. 6 is a view showing a process on how a character image feature extracting portion prepares a character image feature dictionary.

FIG. 6 shows a process on how the character image feature extracting portion 14 prepares the character image feature dictionary 15. In the character image feature extracting portion 14, a character shape standardizing part 14*a* takes out a reference character image from the character shape specimen DB 13, and a character image feature take-out part 14*b* takes out features of the reference character image taken out by the character shape standardizing part 14*a*. And then, in reference to the character shape specimen DB 13, a feature classifying part 14*c* classifies the features extracted in units of reference character image, and stores the classified features in the character image feature dictionary 15 where the classified features are then stored.

As has been described heretofore, the character image feature take-out part 14b determines a feature adaptive value of the differently-weighted reference character images in units of single character and acquires a standard feature of the reference character images.

The character image feature take-out part 14b can prepare various character image feature dictionaries by weighting different character styles and character sizes. The image features of multi-font characters are combined with each other to form features of single character image which are used to prepare a character image feature dictionary. This enables to satisfy automatic index and management of a document image composed of multi-font and/or multi-size characters.

Next, descriptions will be given to the document image DB 19, the document image feature DB 20, the heading region initial processing portion 18, and the character image feature extracting portion 14, which constitute a document image feature extracting section 31 for performing the document image feature extracting process.

The document image DB 19 is used to assign a document ID for identification to a document image inputted by the document image inputting portion 21 and store the document image with the document ID.

After a new document image is stored in the document image DB 19, the heading region initial processing portion 18 is used to locate a heading region of the document image according to the image data thereof, clip the heading region, and send character images thereof to the aforementioned character image feature extracting portion 14.

Figure 7:
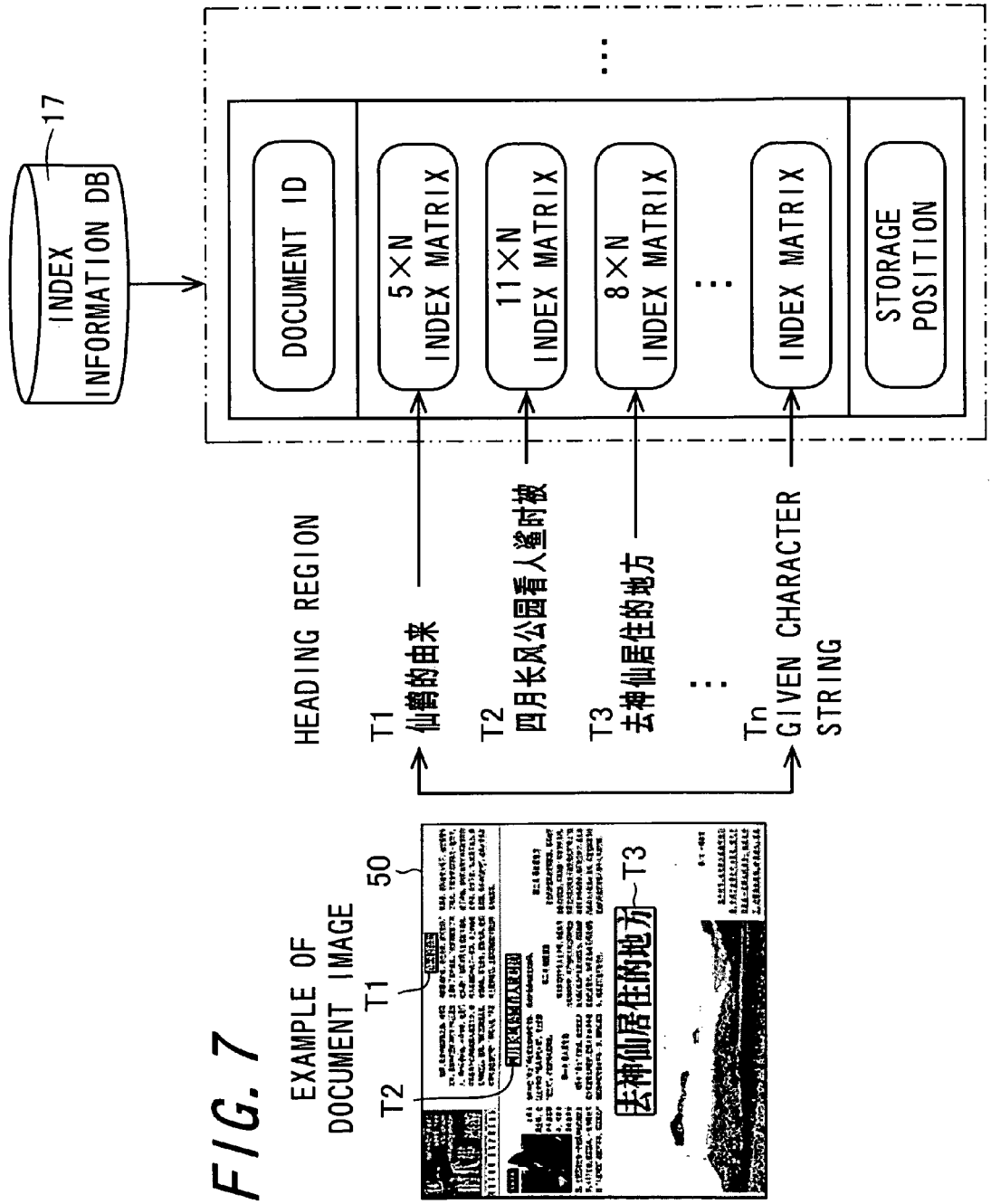
FIG. 7 is a view showing a state where three heading regions T1, T2, and T3 have been located in a document image.

FIG. 7 shows a state where three heading regions T1, T2, and T3 have been located in a document image 50. As will be appreciated from FIG. 7, title parts of the document image 50 are clipped as heading regions T.

The character images which are clipped by the heading region initial processing portion 18 and thereafter sent to the character image feature extracting portion 14, are generally images of character string including a plurality of characters. Accordingly, the following descriptions will be based on that the character images sent by the heading region initial processing portion 18 are the images of character string.

In the present embodiment, the heading region initial processing portion 18 locates the heading regions and clips the heading regions by means of a projection method and a statistical analysis of communicating area. Note that the heading regions T as mentioned above often correspond to tile parts. Various existing methods can be applied to locate and clip the heading regions, for example, the methods described in the Japanese Unexamined Patent Publications JP-A 9-319747 (1997) and JP-A 8-153110 (1996).

As has been described above, only the heading regions T are located and clipped, without covering the whole character region (text region) of a document image. This enables a reduction in an amount of information to be searched, thereby shortening searching time.

Locating only the heading regions T, not the whole text region, is however not an essential constituent factor from the aspect of searching, and the whole text region may be located and clipped. Locating only the heading regions T is, on the other hand, an essential constituent factor from the aspect of preparing meaningful document names which will be described later on.

The character image feature extracting portion 14 divides the images of character string inputted from the heading region initial processing portion 18 into respective character images of single character. After that, the character image feature extracting portion 14 extracts features of each character image, as in the case of preparing the character image feature dictionary 15. Subsequently, the extracted features are stored, for every document image, in the document image feature DB 20.

The document image feature DB 20 stores image feature information of character string included in the heading regions T which have been clipped by the heading region initial processing portion 18, as a feature (feature vector) of each of characters constituting the character string.

As shown in FIG. 7, with respect to one document image 50, the document image feature DB 20 stores, together with the document ID of the document image 50, the character image features of character strings included in all the clipped heading regions T1, T2, T3 . . . , or the character image features of the respective characters constituting the character strings.

Next, descriptions will be given to the character image feature extracting portion 14, the character image feature dictionary 15, the feature similarity measurement portion 16, the index information DB 17, and the document image feature DB 20 which constitute an index information producing section 32 for performing an index information preparing process.

The functions of the character image feature extracting portion 14, character image feature dictionary 15, and document image feature DB 20 are as already described above.

The feature similarity measurement portion 16 reads out features, from the document image feature DB 20, of the character images included in the heading regions T of document image. On the basis of the read-out features, the feature similarity measurement portion 16 prepares, in reference to the character image feature dictionary 15, an index matrix as mentioned later, thereby producing index information of document image.

In this case, the index information is produced for each of document images, and the index matrix included in the index information is prepared for each of heading regions T. Accordingly, when one document image includes a plurality of heading regions T, a plurality of index matrices will be included in the index information of the document image.

Figure 8:
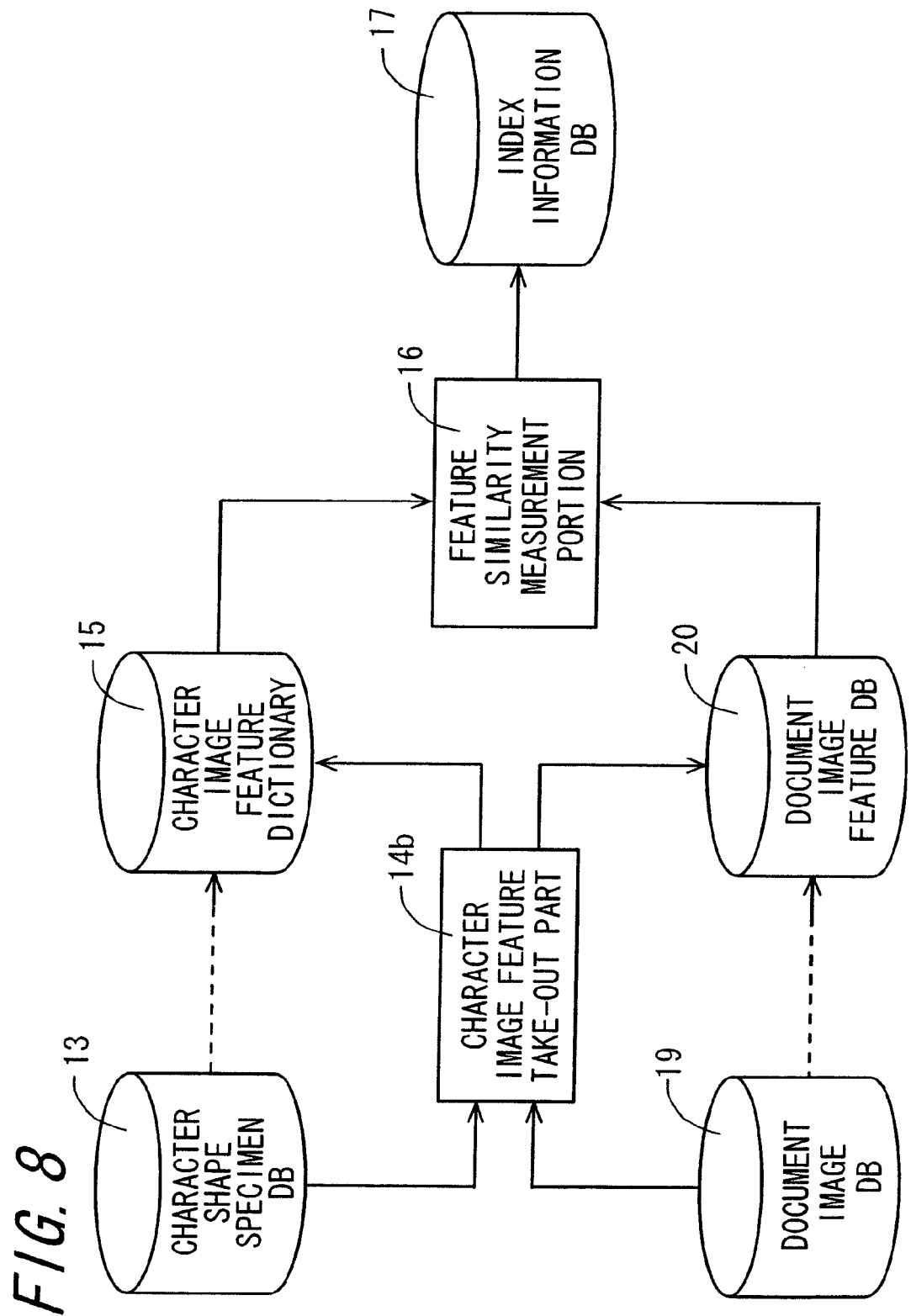
FIG. 8 is a view showing a process on how to prepare an index information DB.

FIG. 8 shows a process on how to prepare the index information DB 17. As mentioned above, after a certain document image is inputted and stored in the document image DB 19, the character image feature extracting part 14b extracts character image features of a character string included in each of heading regions T and stores the extracted features in the document image feature DB 20 where the extracted feature is then stored.

The feature similarity measurement portion 16 reads out from the document image feature DB 20 the image features of the character string included in each of reading regions T. And then, the feature similarity measurement portion 16 carries out measuring similarity of the image of every single character with the reference character image included in the character image feature dictionary 15, thereby preparing an index matrix for each of heading regions T.

And then, the feature similarity measurement portion 16 forms index information by combining these index matrices with the other information of the document image, i.e., information such as the document ID and storage position of the document image in the document image DB 19. The feature similarity measurement portion 16 stores the index information in the index information DB 17 where the index information is then stored.

Figure 9:
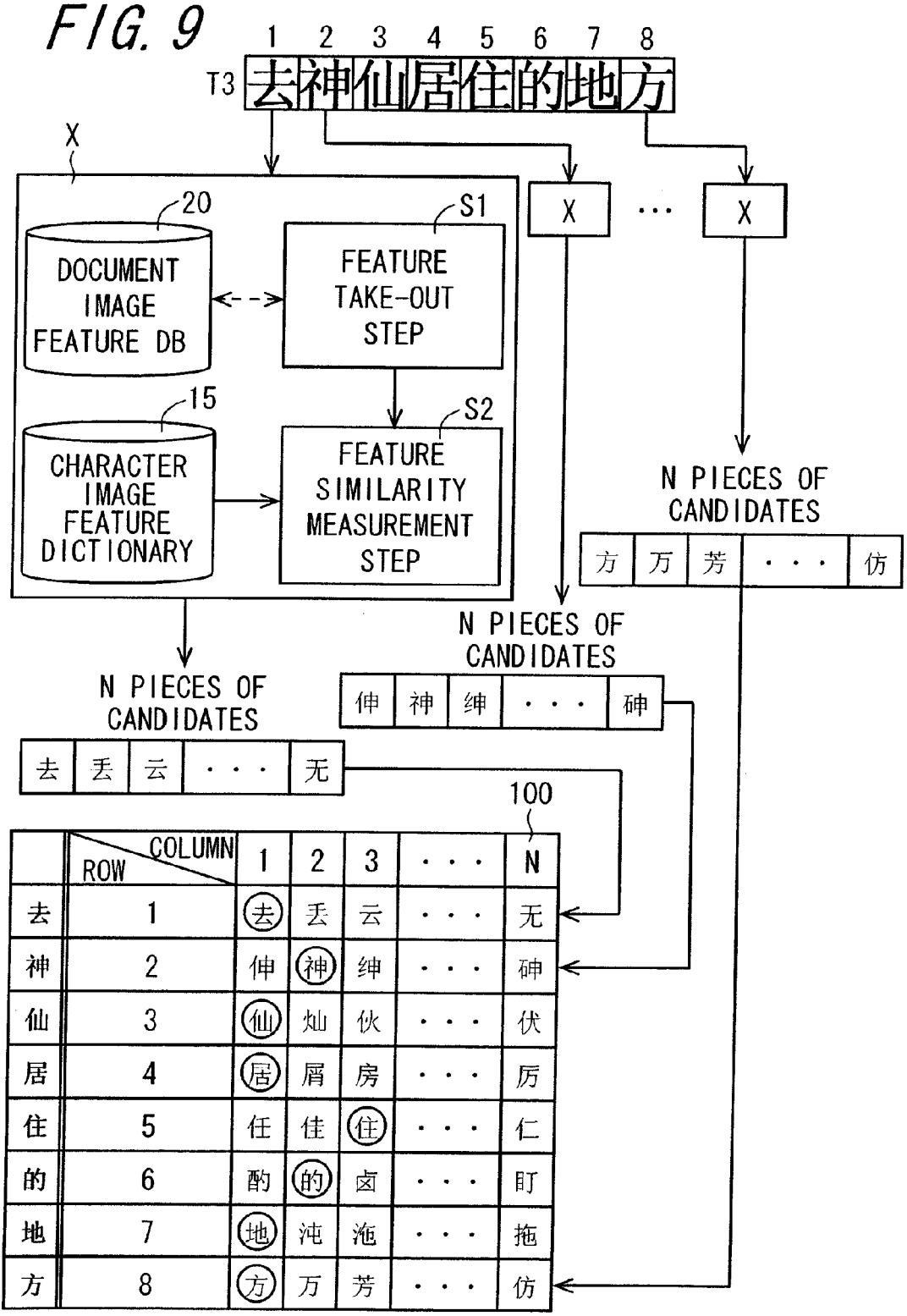
FIG. 9 is a view showing one example of a process on how a feature similarity measurement portion prepares an index matrix.

FIG. 9 shows one example of a process on how the feature similarity measurement portion 16 prepares the index matrix. FIG. 9 is an illustration on how to prepare an index matrix corresponding to eight character images of a character string "去神仙居住的地方" included in the heading region T3 of FIG. 7.

The character string "去神仙居住的地方" is divided into images of separate characters of "去", "神", "仙", "居", "住", "的", "地", and "方". For such a process of dividing the image of character string into the images of separate characters, an existing dividing method can be used.

Eight numbers from 1 to 8 are assigned to the eight characters of "去" . . . , "方" according to an alignment order thereof, in such a manner that a number 1 is assigned to "去", . . . , and a number 8 is assigned to "方". The numbers here correspond to row numbers of the index matrix.

All of the above eight character images are subjected to a process comprising a feature take-out step (S1) and a feature similarity measurement step (S2) as indicated by a referential symbol X in FIG. 9. Step S1 is designed for taking out features of the character image "去" stored in the document image feature DB 20. Step S2 is designed for selecting N pieces of candidate characters in descending order of feature similarity (or in the descending order of degree of similarity) in reference to the character image feature dictionary 15.

Numbers corresponding to the extracting order are assigned to the N pieces of candidate characters extracted in descending order of degree of similarity. The numbers correspond to column numbers of the index matrix. A character correlation value (a correlation value) represents a degree of similarity between each of search characters included in a search keyword and candidate characters thereof. The correlation value is set according to the column numbers.

A table indicated by a reference numeral 100 in FIG. 9 shows the content of index matrix of the character string "去神仙居住的地方". For example, for the character image of the fifth character "住", candidate characters of "任", "佳", "住", . . . , "仁" are extracted and positioned in Row 5 in descending order of degree of similarity. The character having the highest degree of similarity is positioned in the first column. In Table 100, the position of the candidate character "去" is represented as [1, 1], the position of the candidate character "屑" is represented as [4, 2], and the position of the candidate character "仁" is represented as [5, N].

Note that the candidate characters corresponding to the respective characters in the character string are circled in Table 100 of FIG. 9, to facilitate the understanding.

The row number M of the index matrix as has been described heretofore, is determined in accordance with the number of image character in the character string that is clipped as the heading region T by the heading region initial processing portion 18. In addition, the column number N is determined in accordance with the number of candidate characters selected in units of character. Consequently, according to the present invention, by changing the number of dimensions (the number of columns) of index matrix, it is possible to flexibly set the number of elements inside the index matrix or the number of candidate characters. This allows for a precise and substantially complete search in searching the document image.

A way on how the selected candidate character carries information in the index matrix can be appropriately set in accordance with a method of inputting the search keyword. For example, in the constitution that the keyword is inputted from the keyboard 1, the candidate characters are stored in form of information such as character codes, in such a manner that the search keyword inputted from the keyboard 1 can be targeted for searching.

In addition, in the constitution that the keyword is inputted in form of digital data by use of the image scanner 2 and the like, the candidate characters may be stored in form of feature (feature vector) information, in such a manner that the features (feature vectors) of the search keyword can be extracted and the extracted feature vectors can be compared with each other for searching.

FIG. 7 shows an example of data placement of index information in the index information DB 17. In index information of a document image 50 having a plurality of heading regions T1, T2, T3, . . . , Tn, index matrices are linearly-aligned that have been prepared with respect to the plurality of heading regions T1, T2, T3, . . . , Tn. In an example of FIG. 7, a document ID is placed on the top, followed by a plurality of the index matrices, and information of a storage position is placed on the bottom. Here, 5×N represents a size of the index matrix, which has five rows and N columns.

By placing the index information in the way as has been mentioned heretofore, it is possible to swiftly identify storage positions of document image and positions of heading region T of document image in the document image DB 19. The aforementioned identified position information can be used for displaying a search result.

Moreover, in response to a demand in practice, other attributes of the document image may be added to the index information.

Further, in the invention, the lexical analysis method using a language model is applied to the index matrix 100, so as to adjust the respective candidate characters constituting the candidate character string into a candidate character string which makes sense.

To be more specific, on the basis of the prepared index matrix 100, the feature similarity measurement portion 16 prepares a candidate character string by sequentially arranging the first-column candidate characters of the respective rows of the prepared index matrix. And then, the semantic analysis is performed on the word composed of the candidate characters in the respective successive rows constituting the candidate string. And the first-column candidate characters in the respective rows are adjusted in such a manner as that the candidate character string has a meaning.

Figure 10:
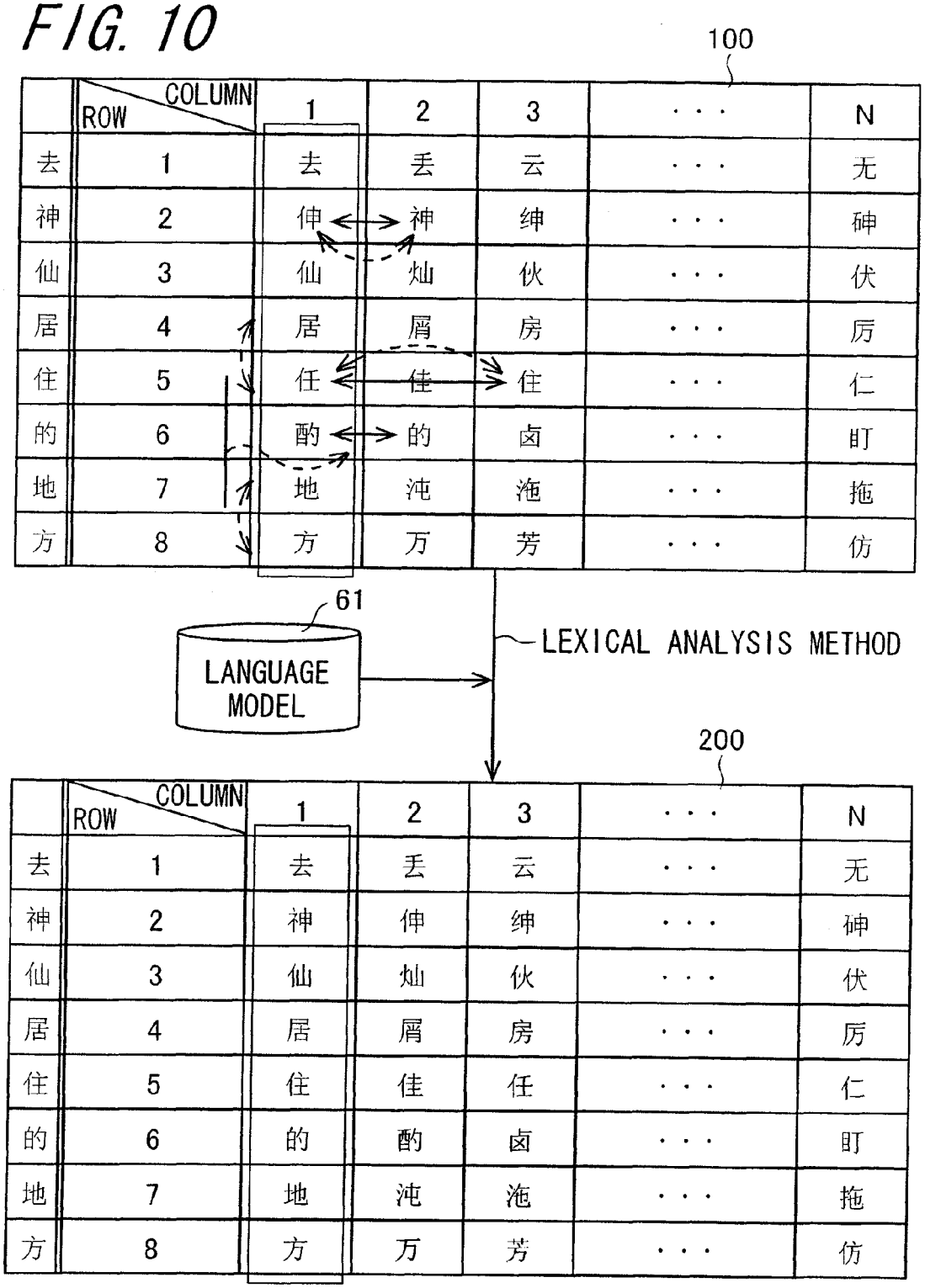
FIG. 10 is an illustration showing a specific example of index matrices before and after such an adjustment using the lexical analysis method that a character string of the first column in the prepared index matrix is adjusted into a character string which makes sense.

FIG. 10 is an illustration showing a specific example of index matrices before and after such an adjustment using the lexical analysis method that the character string of the first column in the prepared index matrix is adjusted into a character string which makes sense.

The upper part of the FIG. 10 shows an index matrix 100 before adjustment. A candidate character string formed according to the index matrix 100 is "去神仙居住的地方" which has no meaning.

With respect to a candidate character string that can be used as the meaningful document name, the conjunction relationship between a subject, a predicate, and an object must be correct semantically. Consequently, by means of the lexical analysis, the aforementioned character string is converted into a candidate character string which makes sense. Specifically, by use of a conceptual dictionary, semantic information is analyzed between the plurality of error candidate characters and the other words in the candidate text, so that the candidate character string is revised to be a candidate character string which makes sense.

A language model 61 used in the lexical analysis as has been mentioned heretofore, may be one that provides statistical data of all prints starting from the Chinese character. That is, according to main concepts of this language model 61, an automatic index system can be established technically. It is possible to obtain the statistical data on the script of news (e.g., "People's Daily") written in Chinese.

In the present embodiment, a bi-gram model is adopted as the language model.

The bi-gram model is a bisyllabic, biliteral, or bilexical group. The bi-gram is generally used to a remarkable degree as the basis of simple statistical analysis of text.

FIG. 11 is a view showing a constitution example of dictionary data 300 used in the bi-gram model.

The first column 301 of the dictionary data shows the first character forming a two-character combination. The second column 302 shows the number of the characters forming the combination with the first character. The third column 303 shows the characters forming the combination with the first character. The fourth column 304 shows a frequency of forming the combination. Further, the fifth column 305 shows the number of Chinese characters forming the combination. Here, the bi-gram model is used, so the number of the character is all two.

In adjusting the candidate character string, on the basis of the Markov process, a Vitarbi-style search is performed by mainly using contextual information in words, such as the probability of character transition and character mixture.

By use of Help function of the aforementioned Chinese dictionary, the index matrix is adjusted automatically. Moreover, after the adjustment, all optimum candidates are adjusted to be placed at the first column.

On the basis of the index matrix 100 determined only from the degree of similarity of the respective characters, firstly, the character string of the first column is adjusted according to the bi-gram model using a context search. Consequently, this enables enhancements in accuracy and efficiency of candidates with respect to similarity.

For the sake of enhancing the accuracy, the character string is partially adjusted according to a word-based bi-gram model. This causes a decrease in the processing speed, but enables a high accuracy.

Here, an adjusting method will be described in detail by taking the index matrix 100 as an example.

By using a character-based big-gram model, in consideration of the relationship between the characters in the second row and the third row, the first candidate "伸" is replaced by the second candidate "神" in the second row so that the character "神" is located in the first column as a first candidate. In addition, in the fifth row, the first candidate "任" is replaced by the third candidate "住" so that the character "住" is located in the first column as a first candidate, in consideration of the relationship between the characters in the fourth row and the fifth row.

Further, an adjustment is performed according to a word-based bi-gram model. According to the word attributes of "神仙" and "居住" as well as a relativity thereof, the first character "酌" is replaced by the second candidate "的" so that the character "的" is located in the first column as a first candidate.

In this way, the index matrix 100 is adjusted into the index matrix 200 whose first column has a candidate character string "去神仙居住的地方" that makes sense. Note that the feature similarity measurement portion 16 may store the index matrix 200 which is obtained through the above adjustment, in the index information DB 17 where the index matrix 200 is then stored.

Figure 12A:
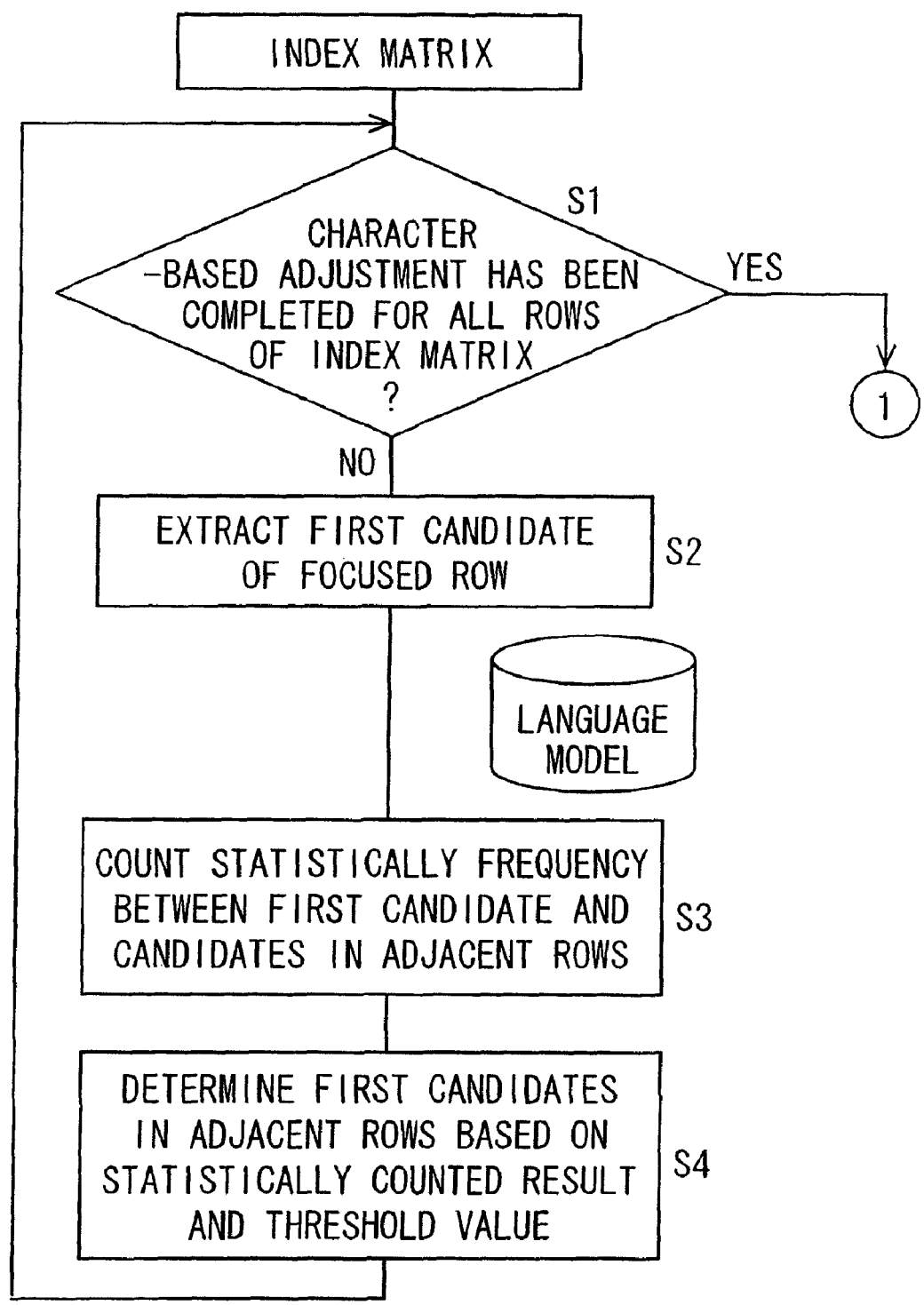
FIGS. 12A and 12B are flowcharts showing a method of adjusting an index matrix using the bi-gram model.
Figure 12B:
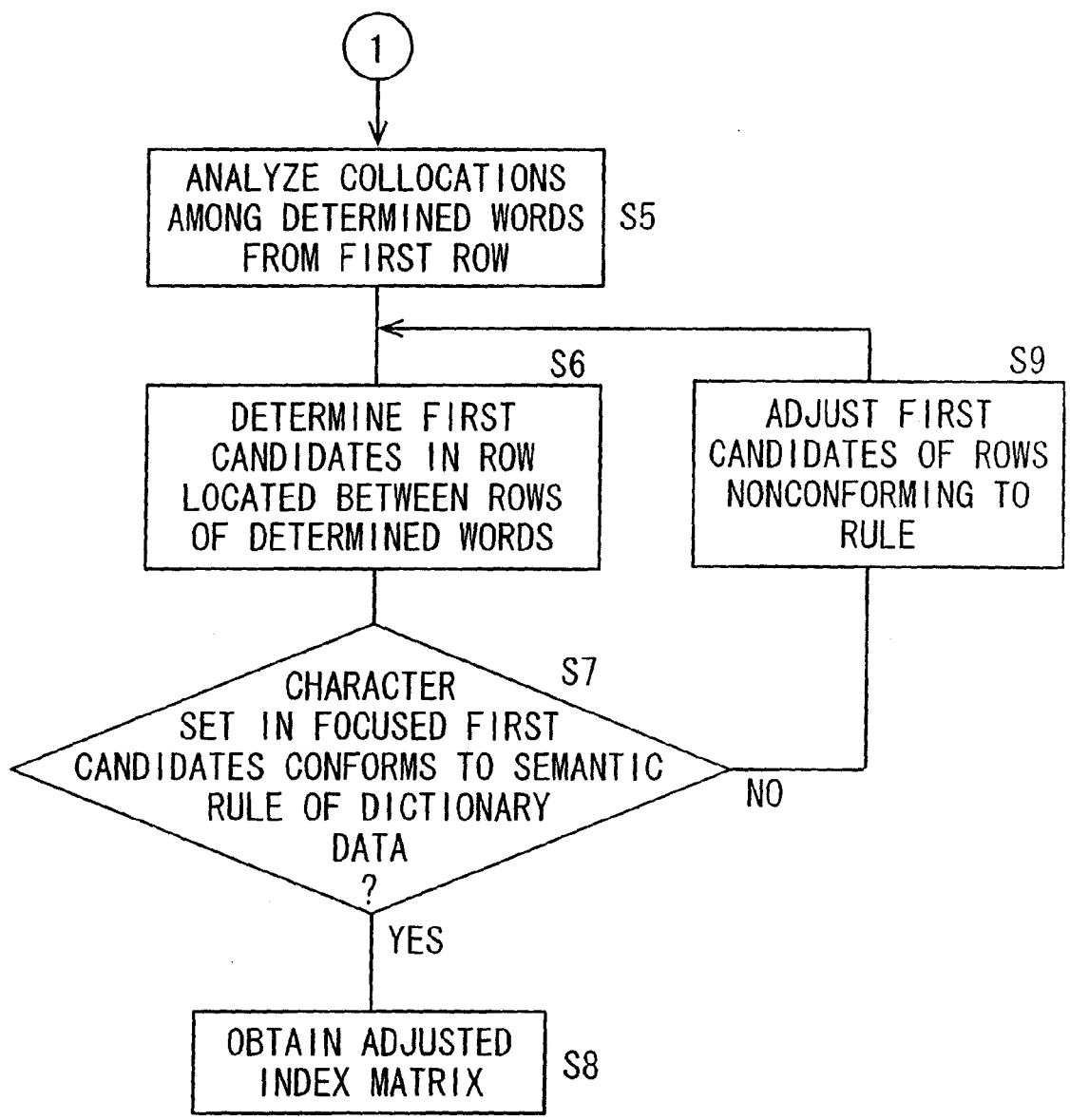

FIGS. 12A and 12B are flowcharts showing a method of adjusting the index matrix using the bi-gram model. The adjusting process consists of nine steps.

In Step S1, it is determined whether or not the character-based adjustment has been completed for all the rows of the index matrix. When the adjustment has not been completed, the adjusting process goes to Step S2. Contrarily, when the adjustment has been completed, the adjusting process goes to Step S5.

In Step S2, the first candidate is extracted of the focused row, that is, the first row in the case of the first processing. In Step S3, by applying the bi-gram model, occurrence frequencies in the dictionary are counted statistically for respective combinations of the first candidate in the focused row and the respective candidates in the adjacent rows.

In Step S4, a comparison is made between the counted value and a predetermined threshold value. When the counted value is greater than the predetermined threshold value, the candidate is adopted as the first candidate.

In Step S5, the collocations among the determined first candidates are analyzed from the first row so as to determine a word. In Step S6, a first candidate is determined in a row between the rows of determined words.

In Step S7, it is determined whether or not the character set in the focused first candidate character string conforms to the semantic rule of the dictionary data. When the character set conforms to the semantic rule, the adjusting process goes to Step S8 and an adjusted index matrix is obtained. In this case, the adjusting process is completed. Contrarily, when the character set fails to conform to the semantic rule, the adjusting process goes to Step S9. In Step S9, the first candidates of the nonconforming rows are adjusted, and the adjusting process goes back to Step S6.

Figure 13:
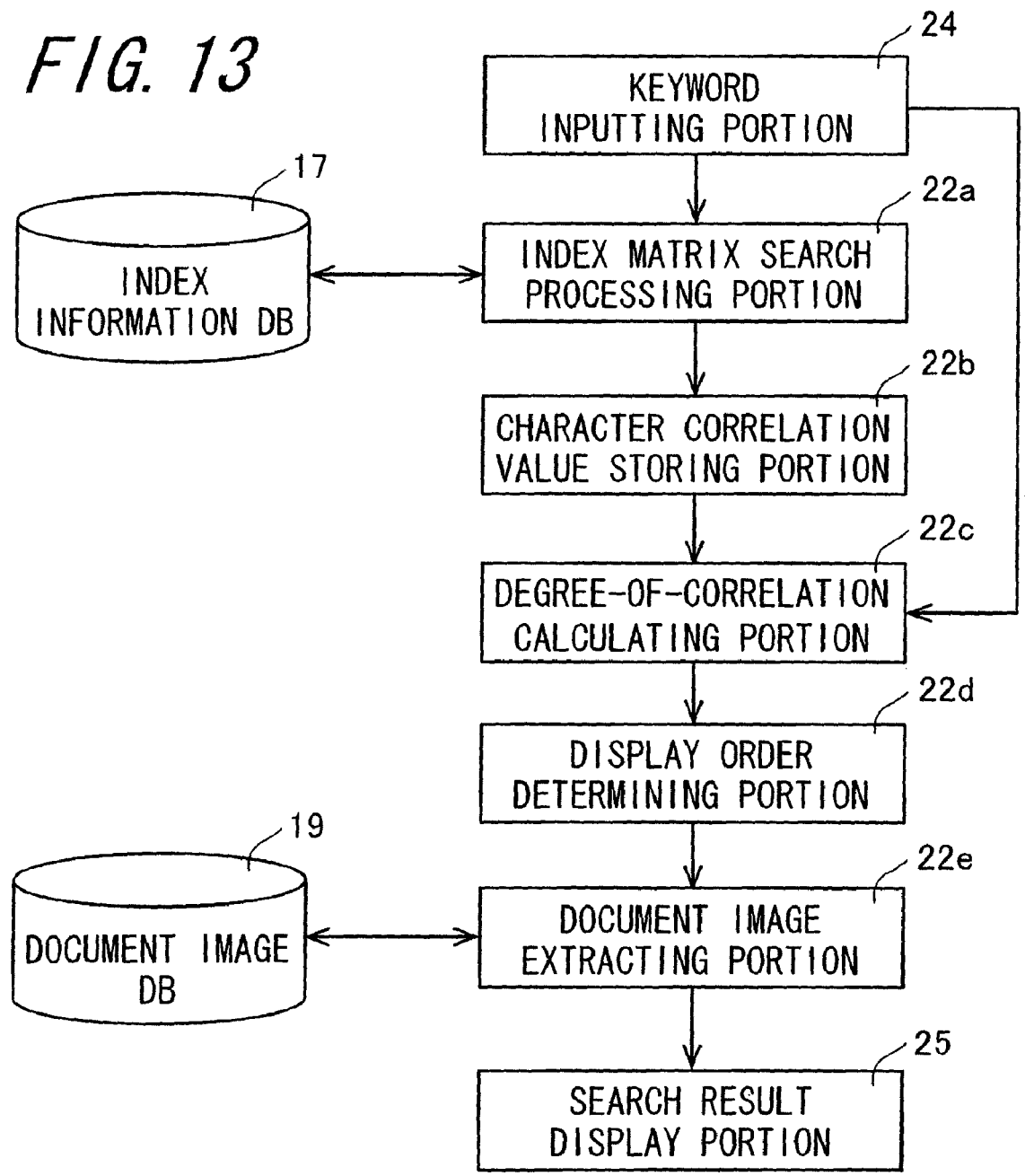
FIG. 13 is an illustration showing functions and a searching process of a searching section.

Next, descriptions will be given to a searching section 22, which performs a search process by use of the index information. FIG. 13 is an illustration showing functions and a search process of the searching section 22. The searching section 22 includes an index matrix search processing portion 22a, a character correlation value storing portion (storing portion) 22b, a degree-of-correlation calculating portion 22c, a display order determining portion (order determining portion) 22d, and a document image extracting portion 22e.

A search keyword is inputted from the keyword inputting portion 24 to the index matrix search processing portion 22a. An example of the keyword inputting portion 24 is the aforementioned keyboard 1 or the aforementioned image scanner 2, etc.

The index matrix search processing portion 22a searches the index information DB 17 so as to detect index matrices including the inputted search keyword. The index matrix search processing portion 22a divides the search keyword into separate search characters and searches for the index matrices including the respective search characters. In this way, when the search characters are included, the index matrix search processing portion 22a acquires matching position information in the index matrices of the search characters. Note that an example of procedure for extracting the index matrix will be described in reference to a flowchart in FIG. 14.

The character correlation value storing portion 22b stores the matching position information acquired by the index matrix search processing portion 22a, and also stores a character correlation value corresponding to the column number of matching position.

After the index matrix search processing portion 22a completes the detection of all the index matrices, the degree-of-correlation calculating portion 22c calculates a degree of correlation between the detected index matrix and the search keyword.

By means of a predetermined method for calculating the degree of correlation, the degree of correlation is calculated using the information of matching position and the information character correlation value stored in the character correlation value storing portion 22b. The calculation of the degree of correlation will be described in reference to FIGS. 15 and 16 later on.

Note that although the constitution employed herein has the character correlation value storing portion 22b which stores the matching position information and the character correlation value corresponding to the column number of the matching position, another constitution may be adopted such that the character correlation value storing portion 22b stores only the matching position information while the degree-of-correlation calculating portion 22c acquires the character correlation value corresponding to the matching position information.

The display order determining portion 22d determines a display order on the basis of the information of degree of correlation calculated by the degree-of-correlation calculating portion 22c. According to an order of document images which are arranged in descending order of degree of correlation of the index matrixes included therein, the display order determining portion 22d determines the display order in such a manner as to allow the content of document images to be displayed by the search result displaying portion 25.

The document image extracting portion 22e reads out image data of document image from the document image DB 19 and outputs the image data to the search result displaying portion 25 so that the document image is displayed on the search result displaying portion 25 in the order determined by the display order determining portion 22d.

The search result displaying portion 25 displays document images according to a display order. The document images may be displayed in thumbnailed form or the like. An example of the search result displaying portion 25 is the aforementioned display device 3 or the like device.

Figure 14:
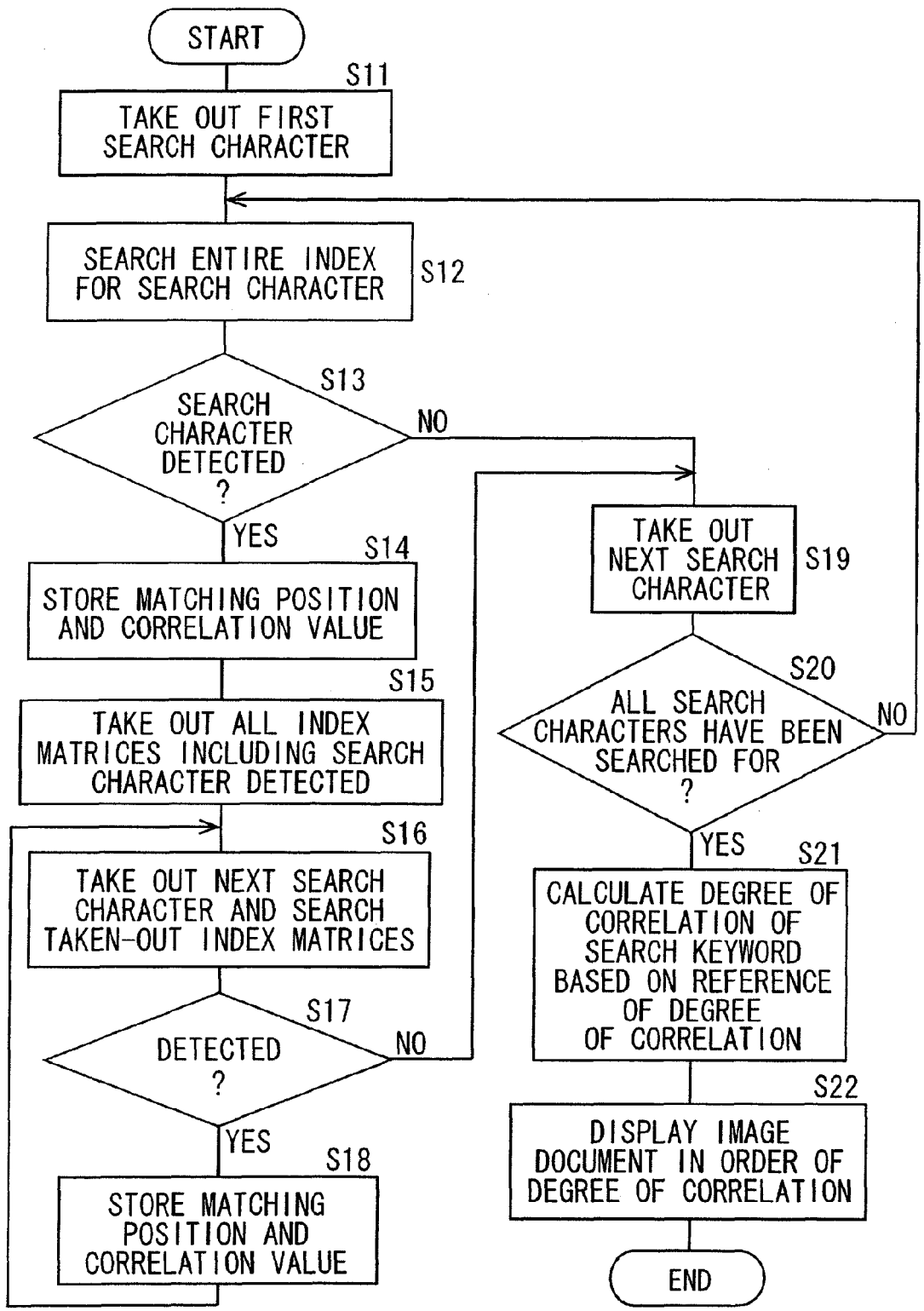
FIG. 14 is a flowchart showing a search procedure in the searching section.

Now, the search procedure will be described. FIG. 14 is a flowchart showing the search procedure in the searching section 22. Step S11 is firstly performed when a search keyword composed of R pieces of character string is inputted and a searching instruction is given correspondingly. In Step S11, the index matrix search processing portion 22a extracts the first search character of the search keyword.

Next, the search procedure goes to Step S12. In Step S12, the index matrix search processing portion 22a searches for the first search character in all the index matrices of the index information DB 17.

When all the index matrices have been searched, it is determined whether or not the first search character has been detected. When the first search character has not been detected at all, the search procedure goes to Step S19. Contrarily, when the first search character has been detected, the search procedure goes to Step S14.

In Step S14, the index matrix search processing portion 22a stores matching position information and character correlation values of the index matrices including the first search character, in the character correlation value storing portion 22b where the matching position information and character correlation values are then stored.

Subsequently, the search procedure goes to Step S15. In Step S15, the index matrix search processing portion 22a extracts all index matrices including the first search character. And then, in Step S16, the index matrix search processing portion 22a extracts another character of the search keyword, which serves as the second search character, and searches for the second search character in the index matrices including the first search character.

After all the index matrices extracted in Step S15 have been searched, the search procedure goes to Step S17. In Step S17, it is determined whether or not the second search character has been detected. When the second search character has not been detected at all, the search procedure goes to Step S19 as in the above case. Contrarily, when the second search character has been detected, the search procedure goes to Step S18.

In Step S18, the index matrix search processing portion 22a stores matching position information and character correlation values of the index matrices including the second search character, in the character correlation value storing portion 22b where the matching position information and character correlation values are then stored.

Next, back to Step S16 again, the index matrix search processing portion 22a extracts yet another character of the search keyword, which serves as the third search character. And further, the index matrix search processing portion 22a searches for the third search character in the index matrices including the first search character extracted in Step S15.

And then, similarly, when the aforementioned search has been completed, Step S17 is performed. In Step S17, the index matrix search processing portion 22a determines whether or not the third search character has been detected. When the third search character has not been detected at all, the search procedure goes to Step S19 as in the above case. Contrarily, when the third search character has been detected, the search procedure goes to Step S18. In this way, the aforementioned search process is performed with respect to yet another search character of the search keyword.

The process from Step S16 to Step S18 as has been described heretofore, refers to a search refinement for the second or following search character in the index matrices which include the first search character and thus extracted in Step S15. The index matrix search processing portion 22a performs the above process from Step S16 to Step S18 until such a determination is obtained in Step 17, that the search character has not been detected at all, or until such a determination is obtained that all the search characters in the search keyword have been searched for. The search procedure then goes to Step S19.

In Step 19, the index matrix search processing portion 22a takes out a next character in the search keyword, which serves as the second search character. Subsequently, in Step S20, it is determined whether or not the last search character has been searched for, that is, whether or not all the search characters have been subjected to the process from S16 to S19. When not all the search characters have been subjected to the process from S16 to S19, the search procedure goes back to Step S12.

And then, as have been mentioned heretofore, the index matrix search processing portion 22a searches for the second search character in all the index matrices in the index information DB 17. When the second search character is detected successfully, the matching position and the character correlation values of the index matrices are stored. Next, the procedure goes to Step S15. And the search refinement is performed by repeating Steps S16 to S18, through which next character of the search keyword, that is, the third or following characters coming after the second search character, are searched for in all the index matrices including the second search character.

The index matrix search processing unit 22a also performs the search process as has been described heretofore, sequentially for the third and following search characters. To be specific, in the search process, a next search character is extracted in Step S19, index matrices including the extracted search character are taken out, and the taken-out index matrices are subjected to the search refinement for a search character which follows the search character included in the index matrices.

After all the search characters in the search keyword have been taken out in Step S19, the search procedure goes to Step S20. When it is determined in Step S20 that all the search characters have been subjected to the search process as have described heretofore, the search procedure goes to Step S21.

In Step S21, according to a reference of degree of correlation, the degree-of-correlation calculating portion 22c calculates the degree of correction between the search keyword and the respective index matrices in the way as will be described later on.

And then, the search procedure goes to Step S22. In Step S22, the display order determining portion 22d determines a display order. The display order is so determined as to enable the display to begin from the document image including an index matrix of a high degree of correlation. Moreover, in Step S22, the document image extracting portion 22e acquires image data of document image from the document image DB 19 and the search result displaying portion 25 displays the document images in descending order of degree of correlations thereof.

Subsequently, referring to FIGS. 15 and 16, descriptions will be given to the methods for calculating a degree of correlation between index matrix and the search keyword in the degree-of-correlation calculating portion 22c, according to the reference of degree of correlation.

Search conditions are described in a block indicated by the reference numeral 101 in FIG. 15. For the sake of calculating the degree of correlation, a relative relationship is supposed between a certain search keyword and an index matrix. The relative relationship is described in the block indicated by the reference numeral 102. When the search keyword and the index matrix has the relative relationship as shown in the block 102 under the search conditions shown in a block 101, the degree of correlation between the search keyword and index matrix is calculated correspondingly according to a calculating formula as shown in a block 103.

Firstly, the search conditions in the block 101 are described. The number of characters in the keyword is set at R. The first search character is represented by C1, the second search character is C2, ..., and the R-th search character is Cr.

An index matrix to be searched is a matrix of M×N cells. That is to say, the number of image characters is M in the character string clipped as the heading region T, and the number of candidate characters is N selected in units of character in the character string.

A character correlation value is defined as a correlation value between a search character and respective candidates thereof. The correlation value is set in accordance with respective positions of the index matrix. Consequently, the character correlation values form a matrix of the same cells as that of the index matrix. That is to say, a matrix Weight of character correlation value is a matrix of M×N cells. For example, Weight[i][j] represents a character correlation value, when a candidate character positioned at [i, j] (also represented by Index[i][j]) in the index matrix is found. In the present embodiment, as long as the column numbers [j] of the index matrix are the same, correlation values of character are the same, independently of row numbers [i].

When a search character is found in two adjacent rows in the index matrix, a degree-of-correlation weighting factor for rows Q is applied to a correlation value of characters in the two rows. When a search character is found in two adjacent rows, it is more likely to include two successively-positioned characters of the search keyword.

When the degree-of-correlation weighting factor for rows Q is set at a high value, a contribution to the degree of correlation calculated by the degree of correlation calculation portion 22c is high for the character correlation values of two rows successively in similarity and is low for the correlation values of nonadjacent respective rows becomes small. That is to say, when the degree-of-correlation weighting factor for rows Q is set at a high value, the search result is close correspondingly to the results obtained by searching for the whole vocabulary. Oppositely, when the degree-of-correlation weighting factor for rows Q is set at a low value, the search result is close to the results obtained by searching for the respective characters.

W1 represents the character correlation value corresponding to the search character C1, and W2 represents the character correlation value corresponding to the second search character C2, ..., and Wr represents the character correlation value corresponding to the search character Cr.

Next, a description will be given to the supposed relative relationship between the search keyword and the index matrix shown in a block 102.

Between the search keyword and the index matrix, there exists a matching relationship between every search character C1, C2, ..., Cr, and any one of the candidate characters in the index matrix. Matching positions of respective candidate characters matching the respective searching characters C1, C2, ..., Cr are represented as [C1i, C1j], [C2i, C2j], ..., [Cri, Crj].

Then, a further relative relationship is expressed by a formula (1) shown in the block 102, that is:

$$C(k+1)i = Cki+1, \; C(m+1)i = Cmi+1 \; (m>k) \tag{1}$$

where k and m represent relative positions of the respective search characters constituting the search keyword; C(k+1)i represents a row number of the index matrix of candidate characters which are in similarity with the (k+1)-th search character of the search keyword; and Cki represents a row number of index matrix of a candidate character matching the k-th search character of the search keyword.

Accordingly, C(k+1)i=Cki+1 represents that the row number in the index matrix of candidate characters which are in similarity with the (k+1)-th search character of the search keyword is identical to a 1-plus row number in the index matrix of candidate characters which are in similarity with the k-th search character of the search keyword. In other words, C(k+1)i=Cki+1 indicates the (k+1)-th search character and the k-th search character are found in two adjacent rows in the index matrix, respectively.

The same goes for C(m+1)i=Cmi+1, which indicates the (m+1)-th search character and the m-th search character in the search keyword are found in two adjacent rows in the index matrix, respectively.

When the search keyword and the index matrix have the relative relationships as have been mentioned heretofore, the degree of correlation between the search keyword and the index matrix is calculated by a formula (2) shown in the block 103. The formula 2 is expressed by:

$$SimDegree = W1 + W2 + \ldots + W(k-1) + Q*(Wk + W(k+1)) + \ldots + W(m-1) + Q*(Wm + W(m+1)) + \ldots + Wr \tag{2}$$

where W1 represents a character correlation value corresponding to the first search character C1, W2 represents a character correlation value corresponding to the second search character C2, and W(k−1) represents a character correlation value corresponding to the (k−1)-th search character C(k−1). Similarly, W(k) represents a character correlation value corresponding to the k-th search character Ck, and W(k+1) represents a character correlation value corresponding to the (k+1)-th search character C(k+1). In addition, W(m−1) represents a character correlation value corresponding to the (m−1)-th search character C(m−1). In the same way, W(m) represents a character correlation value corresponding to the m-th search character Cm, and the W(m+1) represents a character correlation value corresponding to the (m+1)-th search character C(m+1). Then, Wr represents a character correlation value corresponding to the r-th search character Cr.

In this way, the correlation value is calculated by accumulating the correlation values of all the search characters constituting the search keyword.

The k-th search character Ck and the (k+1)-th search character C(k+1) are found in two adjacent rows in the index matrix, respectively. Then, $Q^*(Wk+W(k+1))$ in the formula (2) represents that the sum of the character correlation value Wk and the character correlation value W(k+1) is multiplied by the degree-of-correlation weighting factor for rows Q. It is the same in the case of $Q^*(Wm+W(m+1))$.

Note that the (k−1)-th search character and the k-th search character are not found in two adjacent rows, and therefore both W(k−1) and Wk are not multiplied by the degree-of-correlation weighting factor for rows Q. It is the same in the case of W(m−1) and Wm.

In FIG. 15, however, the character correlation values of all the search characters from W1 to Wr are accumulated in the formula (2) because the search keyword and the index matrix shown in the block 102 are supposed to have such a relative relationship that every search characters C1, C2, . . . , Cr is in similarity with any one of candidate characters in the index matrix.

This is only one example and therefore, in the case where, for example, the search character C1 and the search character Cr have the relative relationship of formula (1) but are not in similarity with any candidate in the index matrix, the degree of correlation is calculated by the following formula:

$$\text{Simdegree} = W2+ \ldots +W(k-1)+Q^*(Wk+W(k+1))+ \ldots +W(m-1)+Q^*(Wm+W(m+1))+ \ldots +W(r-1)$$

which formula has less cumulative terms, naturally resulting in a decreased degree of correlation.

Further, in the case where every character C1, C2, . . . , Cr is in similarity with any one of candidate characters in index matrix, and the (k+1)-th search character and the k-th search character of the search keyword, as well as the (k+2)-th search character and the (k+1)-th search character, are found in the two adjacent rows, respectively, the degree of correlation is calculated by the following formula:

$$\text{SimDegree} = W1+W2+ \ldots +W(k-1)+Q^*(Wk+W(k+1)+W(k+2)) \ldots +WR$$

In this case, the (k−1)-th search character and the k-th search character of the search keyword are not found in two adjacent rows. Therefore, both W(k−1) and Wk are not multiplied by the degree-of-correlation weighting factor for rows Q.

Figure 16:
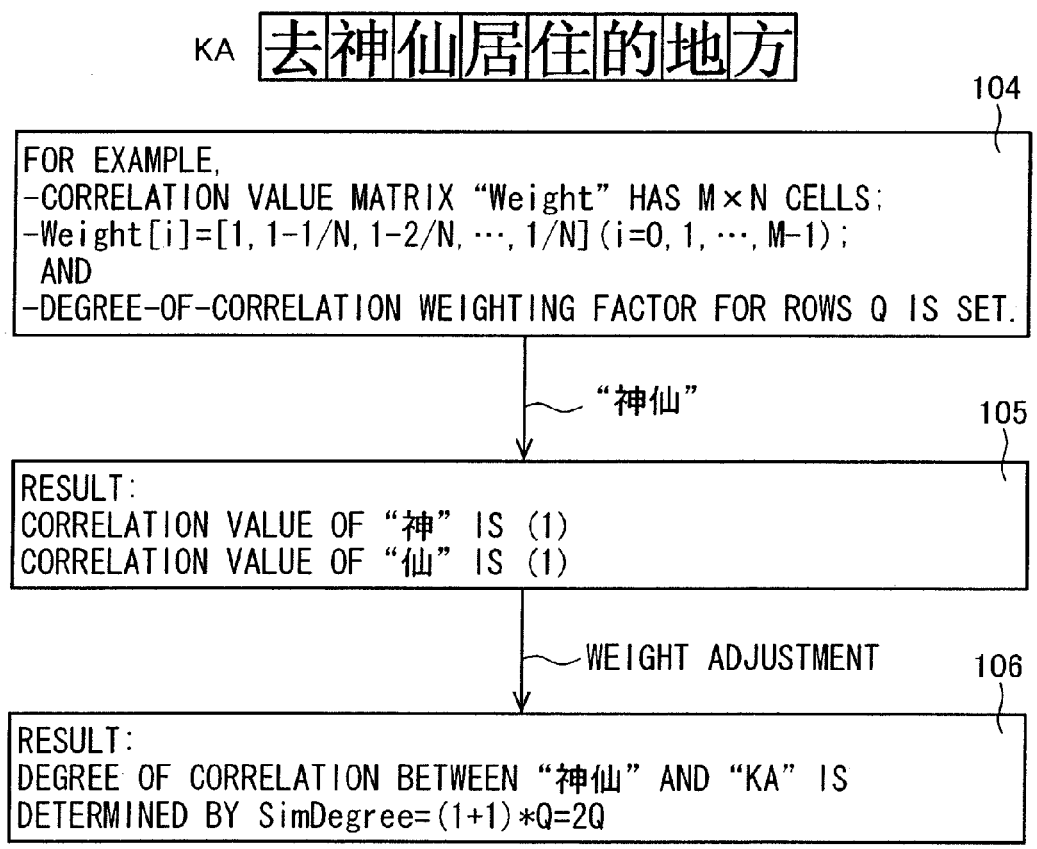
FIG. 16 is an illustration showing a specific example on how to calculate the degree of correlation between the search keyword and the index matrix.

Next, a specific example is described on how to calculate the degree of correlation in reference to FIG. 16. Here, a degree of correlation is determined between the search keyword "神仙" and the index matrix (refer to Table 200) of the character string "去神仙居住的地方" shown in FIG. 10.

Search conditions are shown in a block 104 of FIG. 16. Correlation value matrix Weight has M×N cells. The character correlation value is represented by $\text{Weight}[i]=[1, 1-1/N, 1-2/N, \ldots, 1/N]$ ($i=0, 1, \ldots, M-1$). A degree-of-correlation weighting factor is represented by a symbol Q.

The search keyword "神仙" is divided into the first search character "神" and the second search character "仙". For each of the search characters, an index matrix is searched for a corresponding candidate character.

As will be known in reference to Table 200 in FIG. 10, the search character of "神" corresponds to [2, 2] and the search character of "仙" corresponds to [3, 1] in positions [i, j] of the index matrix.

Accordingly, as shown in a block 105, the character correlation value of the search character "神" is 1, and the character correlation value of the search character "仙" is 1.

The row number of the search character "神" is "2", and the row number of the search character "仙" is "3". As shown in Table 200 of FIG. 10, the two search characters are found in two adjacent rows in the index matrix, respectively.

Accordingly, as shown in a block 106, the character correlation value 1 of the search character "神" and the character correlation value 1 of the search character "仙" are multiplied by the degree-of-correlation weighting factor for rows Q. The degree of correlation between the search keyword "神仙" and the index matrix of the character string "去神仙居住的地方" is thus determined by $\text{SimDegree}=Q^*(1+1)=2Q$.

In the formula for determining the degree of correlation between search keyword and index matrix, parameters such as the weight (character correlation value) of the correlation value matrix and the degree-of-correlation weighting factor for rows Q can be adjusted in accordance with the user's requirements. Consequently, this enables a more ideal search result to be obtained.

By use of the keyboard 1 and the like, the user can, according to his requirements, set appropriately the parameters such as the weight (character correlation value) of the correlation value index and the degree-of-correlation weighting factor for rows Q.

In the index and the similarity measurement method according to image features as have been mentioned heretofore, index and search of multilingual document images can be satisfied and no character recognition is performed with reduced computational effort. The present invention can be applied to document images of not only Chinese but also various other languages.

Figure 17:
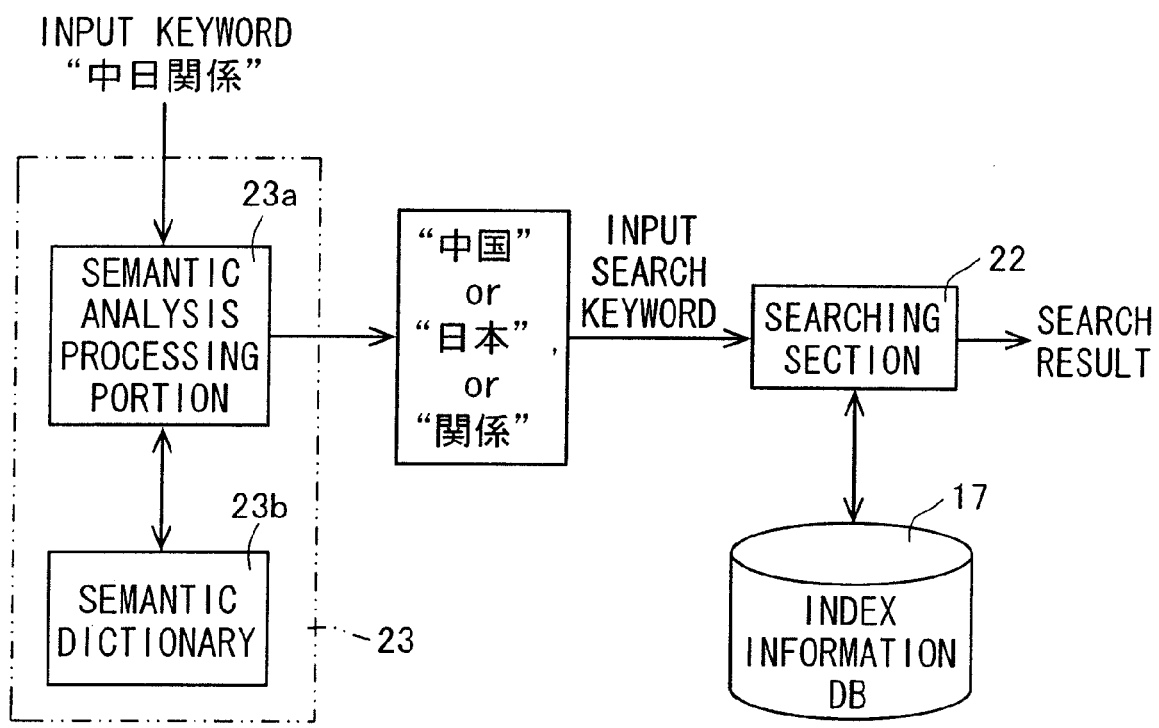
FIG. 17 is an illustration showing a search process provided with a lexical analysis function.

Subsequently, a description will be given to a search process having a lexical analysis function (a semantic analysis function). As also shown in FIG. 13, in the document image processing apparatus 10 of the present embodiment, a lexical analyzing section 23 is provided between the keyword inputting portion 24 and the searching section 22. FIG. 17 shows a search process provided with the lexical analysis function.

The lexical analyzing section 23 is constructed of a semantic analysis processing portion 23a and a semantic dictionary 23b. When a search keyword is inputted from the keyword inputting portion 24, the semantic analysis processing portion 23a analyzes the meaning of the search keyword in reference to the semantic dictionary 23b.

For example, when "中日関係" is inputted as the search keyword, the semantic analysis processing portion 23a inputs to the searching section 22 three words relating to "中日関係", namely "中国", "日本", and "関係". The words "中国", "日本", and "関係" are treated respectively, so that "中国" or "日本", or "関係" is targeted as a search formula.

When the search formula, namely "中国" or "日本", or "関係", is inputted to the searching section 22, the searching section 22 searches the index information DB 17 and extracts document images including "中国", document images including "日本" or document images including "関係".

By doing so, not only document images including the search keyword but also document images related to the search word can be retrieved.

Next, a description will be given to the document image managing section 57 which performs a document image managing process. The document image managing section 57 is constructed of the character image feature extracting portion 14, the character image feature dictionary 15, the feature similarity measurement portion 16, the heading region initial processing portion 18, the document image DB 19, the document image feature DB 20, the document name preparing portion 51, the document image DB managing portion 52, the document image displaying portion 53, and the instruction inputting portion 54. Hereinbelow, the constituent portions constituting the document image managing section 57 will be described.

The description have already made on the functions of the character image feature extracting portion 14, the character image feature dictionary 15, the feature similarity measurement portion 16, the heading region initial processing portion 18, the document image DB 19, and the document image feature DB 20. Here, a description will be only given accordingly to the additional functions required for performing the document image managing process. Specifically, the document image managing process refers to preparing a meaning document name so as to mange the document images in the document image feature DB 20.

Figure 18:
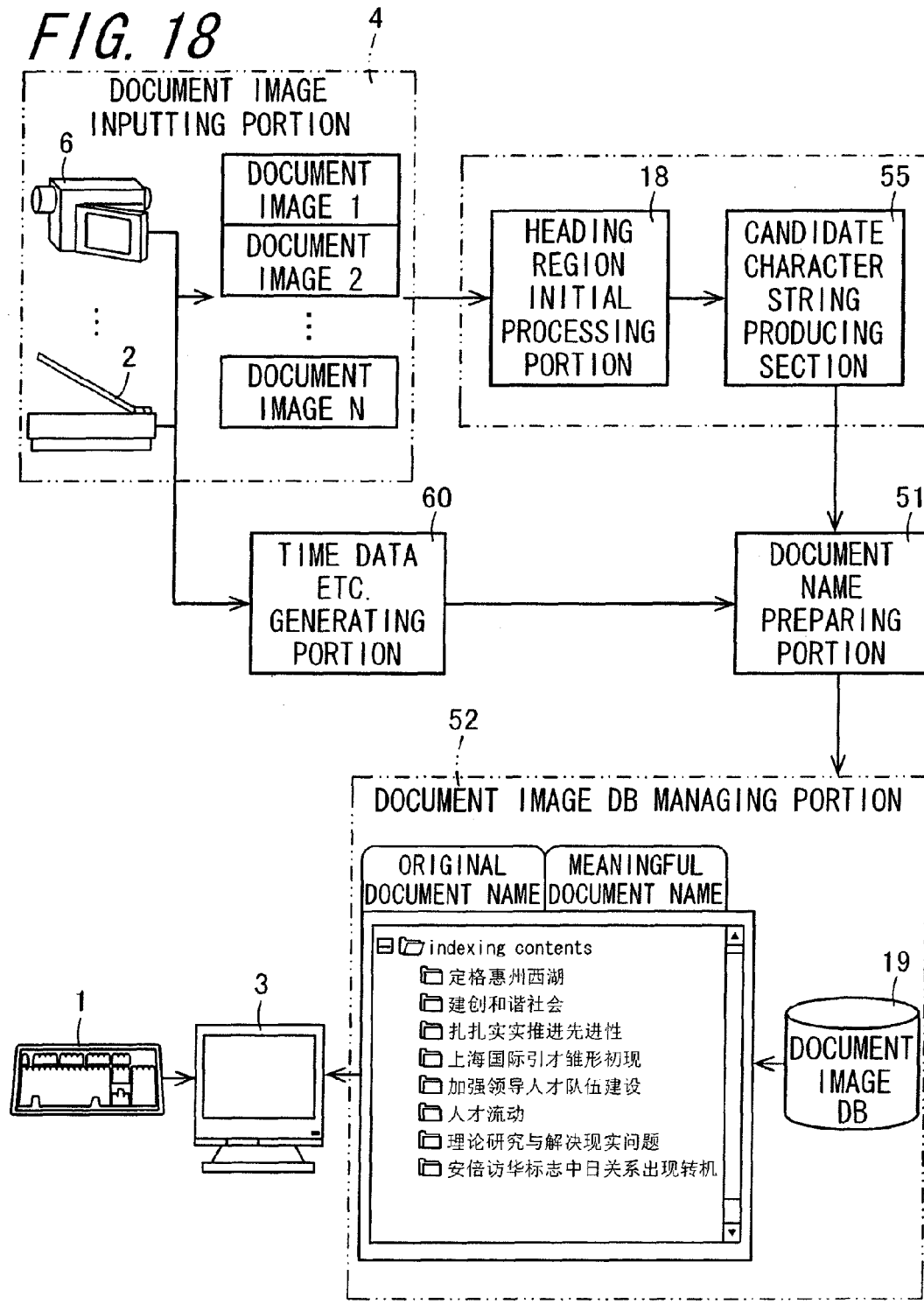
FIG. 18 is an illustration showing a process in a document image managing portion.

The document image managing process is described in reference to FIG. 18. The N pieces of document images, namely, the first document image through the N-th document image, are inputted from the document image inputting portion 21 which is constructed of the image scanner 2 or the digital photographic device 6.

The heading region initial processing portion 18 analyzes contents of the N pieces of respective document images thus inputted, and clips the heading regions to obtain character strings correspondingly. Next, although not illustrated in FIG. 18, the character image feature extracting portion 14, as mentioned above, divides the document images of the character strings included in the clipped heading regions into separated characters so as to extract image features of each of character images.

The candidate character string producing section 55 is constructed of the character image feature dictionary 15 and the feature similarity measurement portion 16. On the basis of the image features of images in the character strings clipped as has been described, the candidate character string producing section 55 selects characters having a high degree of similarity of image feature as candidate characters and prepares candidate character strings in accordance with the character strings included in the clipped heading regions. Simultaneously, the candidate character string producing section 55 adjusts the respective candidate characters constituting the candidate character strings by means of the lexical analysis method, so as to produce candidate character strings which make sense.

The candidate character strings which have been produced to make sense by the candidate character string producing section 55 as has been described, are sent to the document name preparing portion 51.

The document name preparing portion 51 prepares a document name of the inputted document image, which document name includes the candidate strings that have been produced to make sense by the candidate character string producing section 55. The document name including the candidate character string which makes sense, is referred to as "meaningful document name" hereinbelow.

Into the document name preparing portion 51, other data are also inputted that represent an input time and an input route of the document image, from the time data etc. generating portion 60. The document name preparing portion 51 also can produce a file name by use of the other data including at least the time data inputted from the time data etc. generating portion 60.

For example, of the other data such as the time data, the time data are included in a meaningful document name. The meaningful document name may be composed of the time data and the meaningful candidate character string.

Alternately, by use of the other data such as the time data, another document name may be prepared for the same document image. A document name composed of the other data such as the time data, is referred to as an original document name hereinbelow.

By composing the document names as have been described heretofore, it is possible to manage one document image by a meaningful document name and an original document name composed of the other data such as time data.

Meaningful document names and original document names produced corresponding to respective document images are sent to the document image DB managing portion 52, and are further stored in the document image DB 19, with responsive image data corresponding to the document names.

When a user gives an instruction of browsing a document image by use of an instruction inputting portion 54 shown is FIG. 2B, composed of the keyboard 1 and the like, the document image DB managing portion 52 displays a browsing screen on the document image displaying portion 53 shown in FIG. 2B, composed of the display apparatus 3 and the like.

Figure 19:
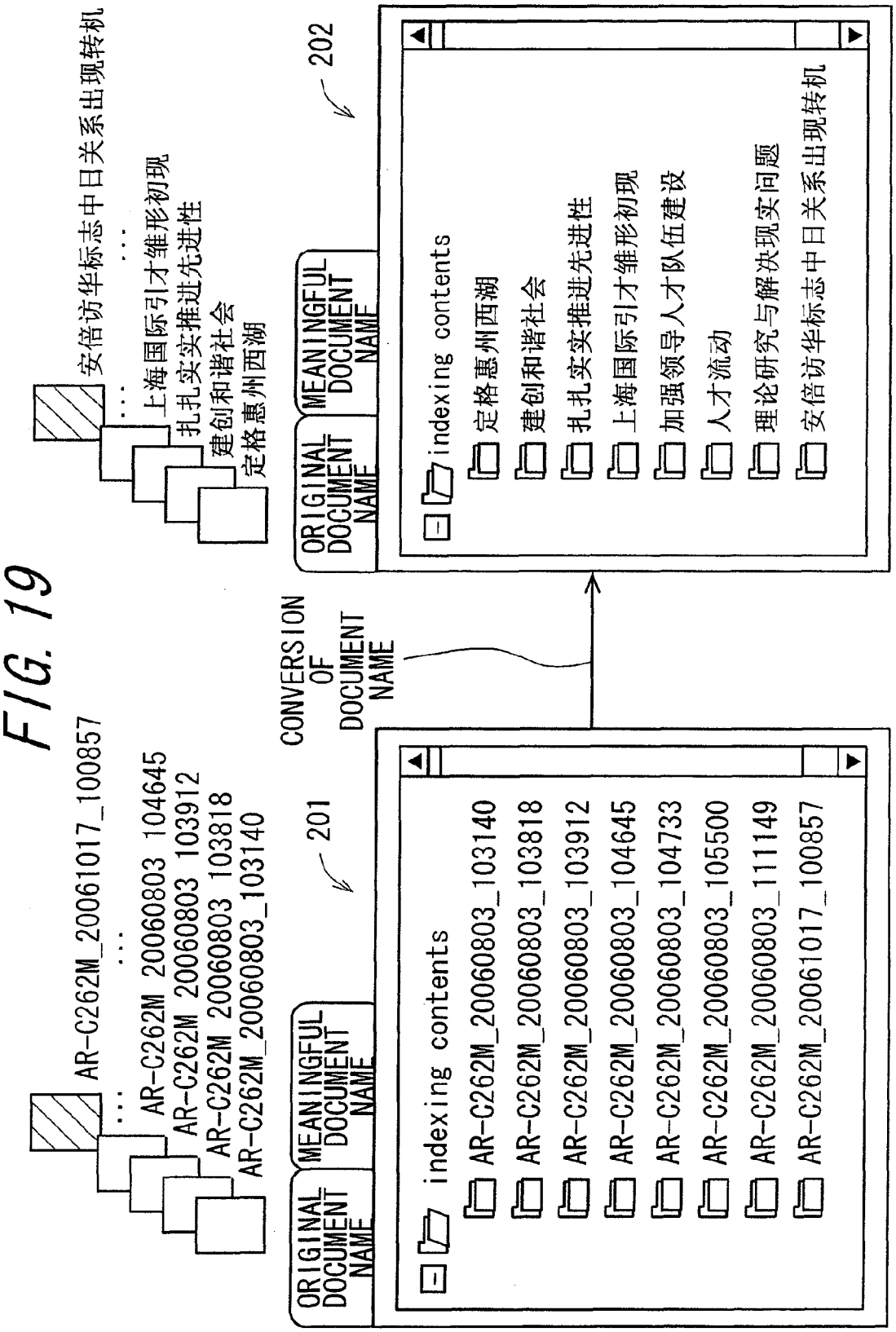
FIG. 19 is a view showing one example of browsing screens, displayed by a document image displaying portion, of a document image stored in a document image DB.

FIG. 19 shows one example of browsing screens, displayed by the document image displaying portion 53, of the document image stored in the document image DB 19.

A screen 201 shown on the left side of FIG. 19 shows a state where stored document images are displayed by a list of original document names thereof. An entry order of the respective document images is shown above the screen 201. A hithermost document image referred to as "AR C262M 20060803 103140" on the drawing sheet, is the document image inputted in the first place. Figures "20060803" represent that the input date is "Aug. 3, 2006". Figures "103140" represent that the input time is "10:31:40".

In the display state as has been described heretofore, an operation such as selecting a tag of meaningful document name displayed on the screen, causes a display of browsing screen to jump to a screen 202 shown on the left side of FIG. 19. The screen 202 shows a state where the stored document images are displayed by a list of the document names thereof.

The screen 202 corresponds to the screen 201, and also in the upper part of the screen 202, the hithermost document image referred to as a meaningful document name of "定格惠州西湖" is the document image inputted in the first place.

In this way, the document images can be browsed in accordance with the meaningful document names, thus enabling a user to manage or search the stored document images with ease. Moreover, by preparing meaningful document names in conjunction with the original names, information such as time data and file names can be seen simultaneously.

Additionally, in the present document image processing apparatus 10, index information is prepared by use of the prepared index matrix. The index information is applied to the search process. For this reason, the heading region initial processing portion 18 clips a plurality of heading regions T included in document images and prepares index matrices for the respective heading regions T. However, if only aiming to prepare meaningful names for the document images, it is not necessary to clip the plurality of headlines included in the document images and prepare the index matrices for the respective clipped headlines.

That is, the document image processing apparatus may be so configured: preparing an index matrix for a character string of headline (character image string) included in a heading region which describes the document image the most aptly; and on the basis of this, employing a character string which is in similarity with the feature of the document image, to prepare a name which has a meaning.

The headline existing on the top row of the document image, for example, can be adopted as the heading region that describes the document image very aptly. This is due to that an important headline is inclined to be aligned on the top row of the document image correspondingly.

The size of the characters included in the heading region can be set to be greater than a certain size threshold and can be set to be greater than characters included in the other clipped heading regions. This is due to that compared to the other headlines, an important headline is inclined to be described in greater character size.

Alternately, the font type of the characters included in the heading region can be set different from those of the characters included in the other clipped heading regions. This is due to that an important headline is inclined to be described by characters having a font type different from that of characters included in the other headlines. Note that other standards other than the aforementioned ones can also be added. Further, the respective standards may be used either individually or in combination.

In addition, as in the case of the present document image processing apparatus 10, a document image processing apparatus may be constructed as to clip a plurality of heading regions from one document image and prepare index matrices for the respective heading regions thereof. In the constitution, the index matrix of the most important headline may be specified by the placement position of the heading region, the character size, or the character font. Moreover, particularly, being in this case, it is also preferable that a candidate character string be prepared so as to include a word which appears most frequently, based on the index matrices of the plurality of clipped heading regions.

As another embodiment of the invention, the index matrix may possibly be adjusted by using a multi-gram model instead of the bi-gram model.

Compared with the first embodiment of the invention, the present embodiment is only different in that the multi-gram model is employed. The other components are the same in both the embodiments, so detailed descriptions on the same components will be omitted.

Figure 20A:
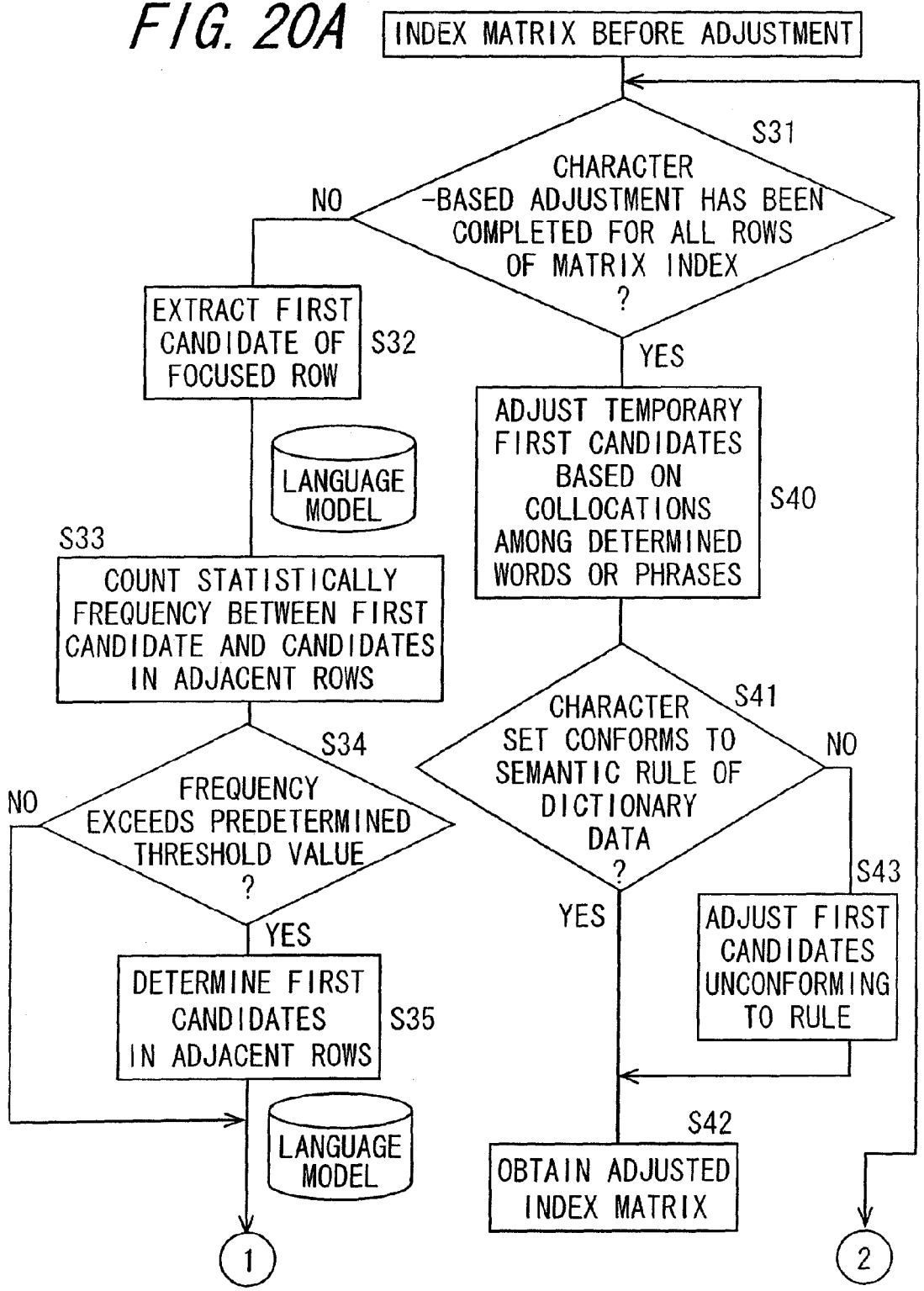
FIGS. 20A and 20B are flowcharts showing a method of adjusting the index matrix by using a multi-gram model.
Figure 20B:
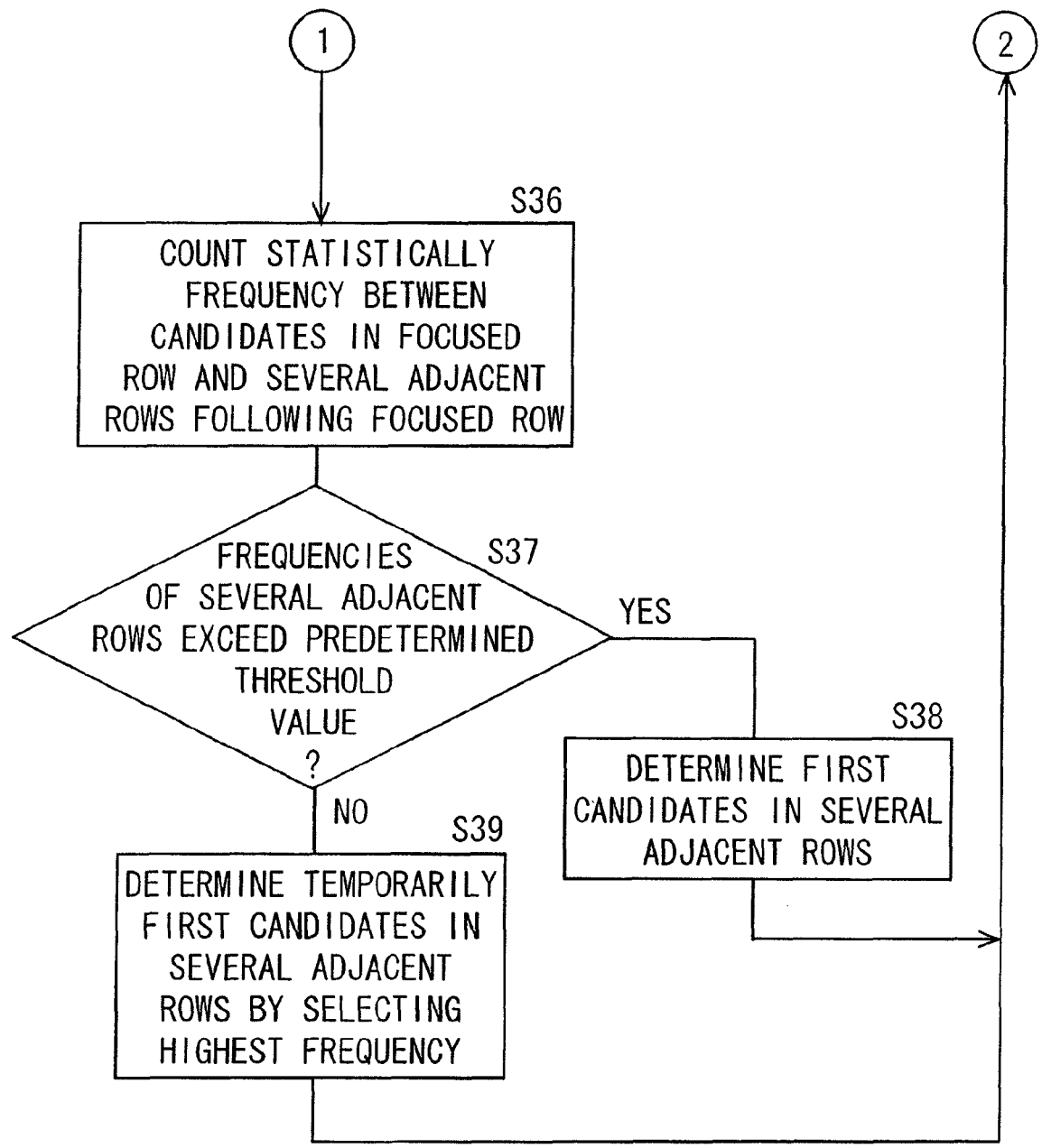

FIGS. 20A and 20B are flowcharts showing a method of adjusting the index matrix by using the multi-gram model.

In Step S31, it is determined whether or not the character-based adjustment has been completed for all the rows of the index matrix. When the adjustment has not been completed, the adjusting process goes to Step S32. Contrarily, when the adjustment has been completed, the adjusting process goes to Step S40.

In Step S32, the first candidate is extracted of the focused row, that is, the first row in the case of the first processing. In Step S33, by applying the multi-gram model, occurrence frequencies in the dictionary are counted statistically for respective combinations of the first candidate in the focused row and the respective candidates in a plurality of adjacent rows.

In Step S34, a comparison is made between the counted value and a predetermined threshold value. When the counted value is greater than the predetermined threshold value, the adjusting process goes to Step S35. Contrarily, when the counted value is less than the threshold value, the adjusting process goes to Step S36.

In Step S35, the first candidate of the adjacent row is determined, and the adjusting process goes to Step S36. In Step S36, by using the multi-gram model again, occurrence frequencies in the dictionary are counted statistically for the respective combinations of the candidate of the focused row and the respective candidates of a plurality of rows following the focused row.

In Step S37, it is determined whether or not the counted value is greater than a predetermined threshold value by making a comparison between the counted value and the predetermined threshold value. When the counted value is greater than the threshold value, the adjusting process goes to Step S38. In Step S38, the respective first candidates are determined of the plurality rows following the focused row. Contrarily, when the counted value is less than the threshold value, the character showing the highest frequency is selected and the selected character is adopted as the first candidate temporally.

In Step S40, the temporary first candidates are determined on the basis of the collocations among the determined words or phrases. In Step S41, it is determined whether or not the character set in the first candidate character string conforms to the semantic rule of dictionary data. If the character set conforms to the semantic rule, the adjusting process goes to Step S42 and an adjusted index matrix is obtained. In this case, the adjusting process is completed. Contrarily, when the character set fails to conform to the semantic rule, the adjusting process goes to Step S43. In the step S43, the first candidates of the nonconforming rows are adjusted, and the adjusting process is completed.

As has been described heretofore, compared with the case of using the bi-gram model, a more accurate candidate character string can be prepared by applying the multi-gram model.

Finally, a hardware logic circuit may be used to constitute respective blocks of the document image processing apparatus 10, particularly the character style normalization processing portion 12, the character image feature extracting portion 14, the feature similarity measurement portion 16, the heading region initial processing portion 18, the searching section 22, the lexical analyzing section 23, the document name preparing portion 51, the document image DB managing portion 52, and the like. Moreover, the aforementioned blocks may be realized by software by use of CPU, which will be described as follows.

That is, the document image processing apparatus 10 is provided with a central processing unit (abbreviated as CPU) for implementing a control program direction for realizing all the functions, a read-only memory (abbreviated as ROM) where the aforementioned program is stored, a random access memory (abbreviated as RAM) for developing the aforementioned program, a storage device which stores memory for storing the aforementioned program and all types of data and the like, and the like devices. And then, the object of the present invention can be achieved also by the following process: providing a recording medium recorded computer-readably with program codes to the aforementioned document image processing apparatus 10; and reading out, by means of the computer (or CPU or MPU), the program codes recorded on the recording medium. The recording medium records computer-readably program codes (executable format program, intermediate code program, and source program) of the control program of the document image processing apparatus 10. The control program is software to realize the aforementioned functions.

The aforementioned recording medium may be, for example, selected from a group including a tape recording medium, a disk recording medium, a card recording medium, and a semiconductor memory recording medium. The tape recording medium includes a magnetic tape or a cassette tape. The disk recording medium includes a magnetic disk such as a floppy (registered trademark) disk or a hard disk, and an optical disk such as CD-ROM, MO, MD, DVD, or CD-R. The card recording medium includes an IC card (including memory card) and an optical card. The semiconductor memory recording medium includes mask ROM, EPROM, EEPROM, and flash RON.

Further, the document image processing apparatus 10 may be so configured as to be connectable to communication network through which the aforementioned program codes can be provided. The communication network which is not particularly limited, may be selected, for example, from a group including Internet, intranet, extranet, LAN, ISDN, VAN, CATV communication network, virtual private network, telephone line network, mobile communication network, satellite communication network, and the like. A transmission medium is not particularly limited, which may be either wired or wireless. The wired medium includes IEEE1394, USB, power-line carrier, cable TV line, telephone line, ADSL line, and the like. The wireless medium includes IrDA or remote infrared light, Bluetooth (registered trademark), 802.11 wireless network, HDR, a cellular phone network, a satellite connection, digital terrestrial network, and the like. In addition, the present invention can be realized also by using computer data signal embedded in the carrier wave, which is realized by electronic transmission of the aforementioned program codes.

The invention may be embodied in other specific forms without departing from the spirit or essential features thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A document image processing apparatus comprising:
a character image feature dictionary for storing image features of character images in units of character;
a character string clipping portion for clipping character images in units of character string composed of a plurality of characters from an inputted document image;
an image feature extracting portion for extracting an image feature of each character image which is obtained by dividing character images of character string clipped by the character string clipping portion, for each of the characters;
a feature similarity measurement portion for selecting N (N>1, integer) pieces of character images in descending order of degree of similarity of image feature as candidate characters, from the character image feature dictionary which stores image features of character image in units of character based on the image features of each of the character images extracted by the image feature extracting portion, preparing a first index matrix of M×N cells where M (M>1, integer) represents a number of characters in the clipped character string, and preparing a second index matrix of character strings including a meaningful character string which is formed by adjusting candidate character strings by application of a lexical analysis using a predetermined language model to the candidate character strings composed of a plurality of candidate characters constituting a first column of the first index matrix;
an index information storing portion for storing the second index matrix prepared by the feature similarity measurement portion, so as to correspond to the inputted document image; and
a searching section for searching, in a searching operation, the index information storing portion in units of search character constituting a search keyword of an inputted search formula, to take out the document image which includes the second index matrix containing the search character,
wherein a position-based correlation value is set for each of the elements in the second index matrix, and
the searching section comprises:
an index matrix search processing portion for searching the index information storing portion for the second index matrix in units of search character constituting the search keyword to detect the second index matrix containing the search characters, and storing in a storing portion, information of matching position of search characters in the second index matrix together with information of the document images having the second index matrix;
a degree-of-correlation calculating portion for calculating a degree of correlation between the search keyword and the second index matrix by accumulating correlation values of the respective search characters according to the information of matching position stored in the storing portion; and
an order determining portion for determining a take-out order of document image based on the calculated result of the degree-of-correlation calculating portion.

2. The document image processing apparatus of claim 1, wherein the feature similarity measurement portion performs the lexical analysis on the candidate character strings by adopting a bi-gram or multi-gram model as a language model.

3. The document image processing apparatus of claim 1, wherein the feature similarity measurement portion adjusts, based on the lexical analysis, the candidate characters of the first column in the first index matrix into a meaningful candidate character string by replacing the candidate character of the first column by another candidate character in the same row in the first index matrix.

4. The document image processing apparatus of claim 1, wherein the character string clipping portion clips a heading region from the inputted document image.

5. The document image processing apparatus of claim 1, wherein the character string clipping portion clips an important region from the document image according to a statistical analysis of communicating area.

6. The document image processing apparatus of claim 1, wherein the image feature extracting portion extracts an image feature of character image by combining a grid-direction-wise feature and a character image peripheral feature.

7. The document image processing apparatus of claim 1, wherein the feature similarity measurement portion selects candidate characters by measuring similarity of all character images stored in the character image feature dictionary to the extracted image features of the character images.

8. The document image processing apparatus of claim 1, wherein the number N of candidate characters to be selected by the feature similarity measurement portion is variable.

9. The document image processing apparatus of claim 1, wherein the searching section takes out the document images sequentially from the document image having an index matrix based on a height of degree of similarity of each search characters constituting the search keyword.

10. The document image processing apparatus of claim 1, wherein when the information of matching position indicates that the search character is found in adjacent rows in the second index matrix, the degree-of-correlation calculating portion accumulates correlation values of the respective adjacent rows after weighted by a degree-of-correlation weighting factor for rows.

11. The document image processing apparatus of claim 10, wherein the degree-of-correlation weighting factor is variable.

12. The document image processing apparatus of claim 1, wherein the correlation value set for each of the elements in the second index matrix is variable.

13. The document image processing apparatus of claim 1, further comprising a character image feature dictionary preparing section for preparing the character image feature dictionary by use of the image feature extracting portion.

14. A document image processing method comprising:
- a character string clipping step for clipping character images in units of character string composed of a plurality of characters from an inputted document image;
- an image feature extracting step for extracting an image feature of each character image which is obtained by dividing character images of character string clipped in the character string clipping step;
- a feature similarity measurement step for selecting N (N>1, integer) pieces of character images in descending order of degree of similarity of image feature as candidate characters, from the character image feature dictionary which stores image features of character images in units of character based on the image features of each of the character images extracted in the image feature extracting step, preparing a first index matrix of M×N cells where M (M>1, integer) represents a number of characters in the clipped character string, and preparing a second index matrix of character strings including a meaningful character string which is formed by adjusting candidate character strings by application of a lexical analysis using a predetermined language model to the candidate character strings composed of a plurality of candidate characters constituting a first column of the first index matrix;
- an index information storing step for storing the second index matrix prepared in the feature similarity measurement step, so as to correspond to the inputted document image; and
- a searching step for searching, in a searching operation, the index information stored in the index information storing step, in units of search character constituting a search keyword of an inputted search formula, to take out the document image which includes the second index matrix containing the search character,
- wherein a position-based correlation value is set for each of the elements in the index matrix, and
- the searching step comprises:
- an index matrix search processing step for searching the index information stored in the index information storing step for the second index matrix in units of search character constituting the search keyword to detect the second index matrix containing the search characters, and storing in a storing portion, information of matching position of search characters in the second index matrix together with information of the document images having the second index matrix;
- a degree-of-correlation calculating step for calculating a degree of correlation between the search keyword and the second index matrix by accumulating correlation values of the respective search characters according to the information of matching position stored in the storing portion and
- an order determining step for determining a take-out order of document image based on the calculated result of the degree-of-correlation calculating step.

15. A non-transitory computer-readable recording medium storing a document image processing program which when executed by a computer performs a document image processing method comprising:
- a character string clipping step for clipping character images in units of character string composed of a plurality of characters from an inputted document image;
- an image feature extracting step for extracting an image feature of each character image which is obtained by dividing character images of character string clipped in the character string clipping step;
- a feature similarity measurement step for selecting N (N>1, integer) pieces of character images in descending order of degree of similarity of image feature as candidate characters, from the character image feature dictionary which stores image features of character images in units of character based on the image features of each of the character images extracted in the image feature extracting step, preparing a first index matrix of M×N cells where M (M>1, integer) represents a number of characters in the clipped character string, and preparing a second index matrix of character strings including a meaningful character string which is formed by adjusting candidate character strings by application of a lexical analysis using a predetermined language model to the candidate character strings composed of a plurality of candidate characters constituting a first column of the first index matrix;
- an index information storing step for storing the second index matrix prepared in the feature similarity measurement step, so as to correspond to the inputted document image; and
- a searching step for searching, in a searching operation, the index information stored in the index information storing step, in units of search character constituting a search keyword of an inputted search formula, to take out the document image which includes the second index matrix containing the search character,
- wherein a position-based correlation value is set for each of the elements in the index matrix, and
- the searching section comprises:
- an index matrix search processing portion for searching the second index matrix in units of search character constituting the search keyword to detect the second index matrix containing the search characters, and storing in a storing portion, information of matching position of search characters in the second index matrix together with information of the document images having the second index matrix;
- a degree-of-correlation calculating portion for calculating a degree of correlation between the search word and the second index matrix by accumulating correlation values of the respective search characters according to the information of matching position stored in the storing section; and
- an order determining portion for determining a take-out order of document image based on the calculated result of the degree-of-correlation calculating portion.

* * * * *